(12) United States Patent
Ciabarra, Jr. et al.

(10) Patent No.: US 10,735,542 B2
(45) Date of Patent: Aug. 4, 2020

(54) TECHNIQUES FOR COMPACT DATA STORAGE OF NETWORK TRAFFIC AND EFFICIENT SEARCH THEREOF

(71) Applicant: Quantum Metric, Inc., Monument, CO (US)

(72) Inventors: Mario Luciano Ciabarra, Jr., Colorado Springs, CO (US); Yiduo Wang, Portland, OR (US)

(73) Assignee: Quantum Metric, Inc., Monument, CO (US)

( * ) Notice: Subject to any disclaimer, the term of this patent is extended or adjusted under 35 U.S.C. 154(b) by 518 days.

(21) Appl. No.: 15/009,488

(22) Filed: Jan. 28, 2016

(65) Prior Publication Data

US 2016/0226976 A1 Aug. 4, 2016

Related U.S. Application Data

(60) Provisional application No. 62/109,520, filed on Jan. 29, 2015.

(51) Int. Cl.
*H04L 29/08* (2006.01)
*H04L 29/06* (2006.01)
*G06F 16/174* (2019.01)

(52) U.S. Cl.
CPC ...... *H04L 67/2828* (2013.01); *G06F 16/1752* (2019.01); *G06F 16/1756* (2019.01);
(Continued)

(58) Field of Classification Search
CPC ..... H04L 67/1097; H04L 67/02; H04L 67/42; H04L 67/2828; H04L 67/2842; G06F 16/1752; G06F 16/1756
See application file for complete search history.

(56) References Cited

U.S. PATENT DOCUMENTS 7,069,497 B1 * 6/2006 Desai .................. G06F 17/3089
707/E17.116
9,026,679 B1 * 5/2015 Shmuylovich .... G06F 17/30365
707/610

(Continued)

FOREIGN PATENT DOCUMENTS

| EP | 2611101 | 7/2013 |
|---|---|---|
| WO | 2016123383 A2 | 8/2016 |
| WO | 2016123383 A3 | 9/2016 |

OTHER PUBLICATIONS

Jang et al., "Computer and Communications Security", Oct. 17, 2011, pp. 309-320.

(Continued)

*Primary Examiner* — Abdulkader M Alriyashi
(74) *Attorney, Agent, or Firm* — Kilpatrick Townsend & Stockton LLP

(57) ABSTRACT

In networked communication systems, a document in a communication (e.g., a response) may be similar between multiple communications involving the same resource, such that duplicate data can be discarded and not stored by a network storage system. Storage of differences in network traffic facilitates compression of storage of network traffic, thereby significantly reducing data storage. Techniques are disclosed for efficient search and retrieval of the compressed data storage. Network traffic may be compared to communications in previous network traffic to identify differences if any. Resource templates may be generated for different (e.g., new) resources identified in network traffic. Storage of the different resources identified in network traffic enables compression of network traffic. Similarity matching may be implemented to improve processing performance for compact storage of network traffic, including determining differences in network traffic for storage.

16 Claims, 11 Drawing Sheets

(52) U.S. Cl.
CPC .......... *H04L 67/02* (2013.01); *H04L 67/1097* (2013.01); *H04L 67/42* (2013.01)

(56) References Cited

U.S. PATENT DOCUMENTS

| | | | |
|---|---|---|---|
| 2002/0138511 A1* | 9/2002 | Psounis | G06F 16/9574 |
| | | | 715/255 |
| 2008/0306943 A1* | 12/2008 | Patterson | G06F 17/30864 |
| 2009/0063954 A1* | 3/2009 | Shimizu | G06F 17/2247 |
| | | | 715/234 |
| 2010/0332586 A1* | 12/2010 | Jogand-Coulomb | |
| | | | H04L 67/2847 |
| | | | 709/203 |
| 2014/0082006 A1* | 3/2014 | Knight | G06F 17/30628 |
| | | | 707/758 |
| 2014/0188822 A1* | 7/2014 | Das | H03M 7/30 |
| | | | 707/693 |
| 2014/0211813 A1* | 7/2014 | Gochi Garcia | H04L 69/04 |
| | | | 370/477 |
| 2015/0019815 A1 | 1/2015 | Aronovich | |

OTHER PUBLICATIONS

PCT/US2016/015433 "International Search Report and Written Opinion", dated Aug. 1, 2016, 18 pages.
PCT/US2016/015433, "Invitation to Pay Add'l Fees and Partial Search Report", dated May 18, 2016, 4 pages.
Israel Office Action No. IL253116, dated Apr. 29, 2019, 4 pages.
Jang et al., "BitShred: Feature Hashing Malware for Scalable Triage and Semantic Analysis", Proceedings of the 18th ACM conference on Computer and communications security, Oct. 17, 2011, pp. 309-320.

* cited by examiner

TECHNIQUES FOR COMPACT DATA STORAGE OF NETWORK TRAFFIC AND EFFICIENT SEARCH THEREOF

CROSS-REFERENCES TO RELATED APPLICATIONS

The present application claims priority from and is a non-provisional application of U.S. Provisional Application No. 62/109,520, entitled "SYSTEMS AND METHODS FOR COMPACT DATA STORAGE OF NETWORK TRAFFIC AND EFFICIENT SEARCH THEREOF" filed Jan. 29, 2015, the entire contents of which are herein incorporated by reference for all purposes.

FIELD

The present disclosure relates generally to capturing and storing network data. More specifically, embodiments relate to techniques (e.g., systems, apparatuses, computer-readable media, and methods) for compact data storage of network traffic and the efficient search thereof.

BACKGROUND

Computer systems communicate with other computer systems using defined protocols through a data communications network. For example, a significant portion of data transmitted over the Internet is web traffic sent to or received from web servers using the Hypertext Transfer Protocol (HTTP).

While such data is transmitted between computer systems, other devices may capture this traffic for later introspection. Network traffic data is commonly used by corporations, businesses, governmental agencies, internet service providers, and other organizations to analyze and inspect various communications between computer systems. The uses of the captured data may include fraud prevention, behavior analysis, security analysis, website optimization, etc.

A tremendous amount of cost and burden will be placed on those that have come to rely on network traffic data. For example, the amount of storage and costs associated with the storage demanded for storing captured network traffic will grow similarly as the amount of data constituting network traffic grows. Further, as the amount of traffic in a given time period grows, and hence the amount of bytes stored grows, the amount of time required to process, search, and analyze this data also becomes increasingly lengthy. Some organizations have attempted to change their ways of storing smaller amounts of network traffic (e.g., network traffic from shorter time periods) to account for the ever-increasing traffic. However, storing limited amounts of network traffic may reduce their ability to perform useful analysis over time, thus reducing the usefulness of the system as it is limited to only making use of small snapshots of data. An organization may not be able to determine changes in communication by limiting storage of network traffic. The amount of storage demanded for storing network traffic can be prohibitive for search and retrieval.

Therefore, it is desirable to provide new techniques to solve these challenges.

BRIEF SUMMARY

Embodiments relate generally to capturing and storing network data. More specifically, embodiments relate to techniques (e.g., systems, apparatuses, computer-readable media, and methods) for compact data storage of network traffic and the efficient search thereof. Storage of data (e.g., network traffic) in a compact manner as disclosed herein has various applications.

The techniques disclosed herein reduce storage costs for storing network traffic and can improve processing efficiency by reducing the amount of data stored. Further, the limited amount of data can be used to recreate the data communicated at any particular instance. For example, an entity can use the compact stored network traffic to determine what (e.g., a web page) that was transmitted to a user, and by doing so, can determine what the user received. This can enable the entity to assess how users or computer systems use and interacted with a website, as well as how the website behaves and responds to dynamic interactions. Through analysis of data stored using techniques disclosed herein, an organization can discover points of failure, successes, and trends, any of which may then be used to optimize the design of the organization's operations and service.

In some embodiments, compact storage of network traffic may include performing a comparison to discover what parts of a communication have changed, and only the differences are stored, optionally along with metadata such as packet or connection level data. Accordingly, as web servers typically serve nearly identical data to its many clients, the compression is much more effective than other network traffic storage methods, which typically store significant amounts of duplicate data. Accordingly, embodiments provide for significant reductions in data storage needs for network traffic data and simultaneously vastly reduce the time and processing resources required to analyze and search the acquired network traffic.

Network traffic may be compared to previous network traffic to identify differences. Resource templates ("templates") may be generated for different (e.g., new) resources (e.g., an HTML web page) identified in network traffic. Storage of the different resources identified in network traffic enables greater compression of network traffic. A resource in a communication (e.g., a response or a request) may be parsed into a plurality of data items (e.g., tokens or strings). One or more hashing algorithms (e.g., a min hash algorithm) may be applied to the plurality of data items to determine a set of hash values representing the resource. Previously stored resources may be processed to apply the same hashing algorithm that is applied to a resource in a communication. A set of hash values may be determined for each of the templates. The set of hash values may be compared to the set of hash values generated for the resource in the communication. A similarity analysis may be performed to compare the set of hash values for the resource to each of the set of hash values for the different templates. Similarity matching may be implemented to improve processing performance for compact storage of network traffic, including determining differences in network traffic for storage. An edit log may be generated for the differences between a template that matches the resource based on the similarity analysis. A new template may be generated for the resource based on determining that the resource does not match a template. The techniques disclosed herein enable a reduction in costs of network storage by preventing the storage of duplicate network traffic.

Techniques are disclosed to improve the processing performance for searching storage of network traffic. The techniques for compact storage of network traffic enable a reduction in the amount of network traffic that is stored, and therefore, enable a reduction in the amount of data to be searched and retrieved. For a template that is created, the words in the template may be stored using a variety of techniques. The words may be indexed in a number of different index formats to enhance their searchability for identifying a template. The words of a template may correspond to parsed data that is identified in a communication. Words may be indexed in a data structure (e.g., a hash table) based on template identifiers. Each of the template identifiers correspond to a template. Each word in the hash table may be associated with a template identifier of a template that has that word. The hash table may be configured to store information indicating a cardinality of all the different words that are discovered in the different templates. The hash table of words may be searchable to identify a template based on one or more words. For example, using the indexes of the hash table for a search query, a list of templates containing a word can be retrieved from the hash table. It can be possible to query the hash table to determine whether one or more templates contains a particular word by first querying the hash table for a sorted list of the word, and then implementing a binary search on the sorted list to determine the membership of the template identifier in relation to the sorted list for the word. The number of occurrences of each word in the index, or the cardinality of that word, can also be determined by performing a look up in the hash table. When a single word is searched, the hash table is queried to rapidly return the list of template identifiers that contain the word. When multiple words are queried, the result set is reduced to the smallest number of templates based on the word having the lowest cardinality among all the queried words.

Some embodiments enable organizations to utilize the compact storage of network data to recreate content that was requested by a user. The templates and the information stored in association with a template can be used to regenerate the content. The differences or changes in the content can also be regenerated. The techniques disclosed herein enable an organization to dynamically recreate content rendered on a website using fractional storage of the original data size so that the organization can determine what was seen by a client. Such an ability enables an organization to recreate a user experience, which can prove to be useful for identifying problems in content provided on the website.

In some embodiments, a computing system may be implemented for performing compact data storage of network traffic and the efficient search thereof. The computing system may be configured to implement methods and operations described herein. The cloud computing infrastructure system may include a memory coupled to one or more processors, the memory storing instructions, where the instructions, when executed by the one or more processors, cause the one or more processors to perform one or more methods or operations described herein. Yet other embodiments relate to systems and machine-readable tangible storage media, which employ or store instructions for methods and operations described herein.

In at least one embodiment, a method includes receiving one or more data packets comprising a communication transmitted by a server computer. The communication may include a resource requested by a client computer system. The method may include parsing, based on one or more delimiters, the requested resource to identify a plurality of data items in the requested resource. The method may include generating a first set of hash values for the plurality of data items, where the first set of hash values is generated based on applying one or more hashing algorithms to the plurality of data items. The method may include retrieving, one or more stored templates, each of the one or more stored templates including different content. The method may include determining a second set of hash values for each of the one or more stored templates. The method may include, for each stored template of the one or more stored templates, performing a comparison of the first set of hash values to the second set of hash values corresponding to each stored template. The method may include computing a similarity value based on the comparison. The method may include, upon determining that the similarity value indicates that the first set of hash values is not similar to the second set of hash values for a first stored template, generating an edit log using the plurality of data items and the first stored template. The edit log may identify differences between the plurality of data items of the requested resource and the first stored template. The method may include storing the edit log in a data store. The method may include, upon determining that the similarity value indicates that the first set of hash values is similar to the second set of hash values for a first stored template, storing the plurality of data items as a new template.

In some embodiments, the method may include determining whether the similarity value satisfies the similarity threshold. Based on determining that the similarity value does not satisfy the similarity threshold, the method may determine that the first set of hash values is not similar to the second set of hash values for the first stored template. Based on determining that the similarity value does satisfy the similarity threshold, the method may determine that the first set of hash values is similar to the second set of hash values for the first stored template.

In some embodiments, generating the edit log includes executing a difference algorithm to identify the differences between the plurality of data items of the requested resource and the first stored template.

In some embodiments, one or more data packets may be received as mirrored packets from a data tap device located between the client computer system and the server computer. Additionally or alternatively, one or more data packets may be received by a computer system directly by transmission from the client computer system. In some embodiments, receiving a set of data packets comprises a request for the resource transmitted by the client computer system to the server computer. The request for the resource may include a HyperText Transfer Protocol (HTTP) request. The method may include identifying a resource identifier of the requested resource, where the resource identifier of the resource comprises at least some of a Uniform Resource Locator (URL). The communication may include an HTTP response. The resource may include one of a HyperText Markup Language (HTML) document, a Cascading Style Sheets (CSS) file, or a JavaScript file.

In some embodiments, the method may include determining that the stored template is to be updated and updating the stored template based on the edit log. Determining that the stored template is to be updated may include determining that a threshold amount of time has passed since the stored template was stored. Determining that the stored template is to be updated may include identifying that a first threshold amount of edit logs have been generated for the stored template and that each of the edit logs include at least a second threshold amount of differences between the respective edit log and the stored template. In some embodiments, the method may include: identifying a plurality of candidate templates based upon a corresponding plurality of edit logs stored in the data store; selecting one of the plurality of candidate templates to be the stored template, where selecting the one of the plurality of candidate templates to be the stored template comprises calculating an average edit distance value for each of the plurality of candidate templates by determining an edit distance between each distinct pairing of the plurality of candidate templates. Selecting the one of the plurality of candidate templates to be the stored template may include: determining that the one of the plurality of candidate templates has a smallest calculated average edit distance value; and determining that the one of the plurality of candidate templates is different than the stored template.

In some embodiments, the method may include: updating a plurality of entries of a first index associated with a plurality of words of the resource to identify the resource; and incrementing a cardinality count value of a plurality of entries of a second index associated with the plurality of words of the resource. The first index and the second index may each comprise a hash table.

In at least one embodiment, a method includes receiving a query including a plurality of search terms. The method may include determining a plurality of cardinality values, each of the plurality of cardinality values determined for a different one of the plurality of search terms. A cardinality value determined for one of the plurality of search terms may indicate one or more resource templates including the search term. Each of the one or more resource templates may be associated with a particular resource and may be further associated with one or more communications comprising different versions of the particular resource. The method may include identifying a plurality of the resource templates including a first search term. The first search term may be the one of the plurality of search terms. The first search term may have a lowest determined cardinality value of the determined plurality of cardinality values. The method may include, for each of the plurality of resource templates, generating a result set of data for the query, based upon using at least one of the plurality of search terms and one or both of an addition index and a deletion index. The result set may be generated to include an identifier of each of the one or more responses associated with the resource template. The addition index may identify, for a first set of words that do not exist in the resource template, a first set of responses associated with the resource template that does include the first set of words. The deletion index may identify, for a second set of words that do exist in the resource template, a second set of responses associated with the resource template that does not include the second set of words. The method may include transmitting the result set of data for the query.

A better understanding of the nature and advantages of embodiments of the present invention may be gained with reference to the following detailed description and the accompanying drawings.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Techniques for compact data storage of acquired network traffic and efficient search of the data are described. Some embodiments can reduce processing time by optimizing processing for comparison of network traffic against previously stored network traffic. Templates can be stored for content in network traffic that is different and those templates may be used to identify new content in network traffic. The templates may be useful to enable recreation of communications for analysis of network traffic. The templates may be stored such that greater compression may be achieved for storing network traffic. Some embodiments can also address the indexing and searching of the compressed network traffic for fast analysis and search of network traffic.

I. System

Figure 1:
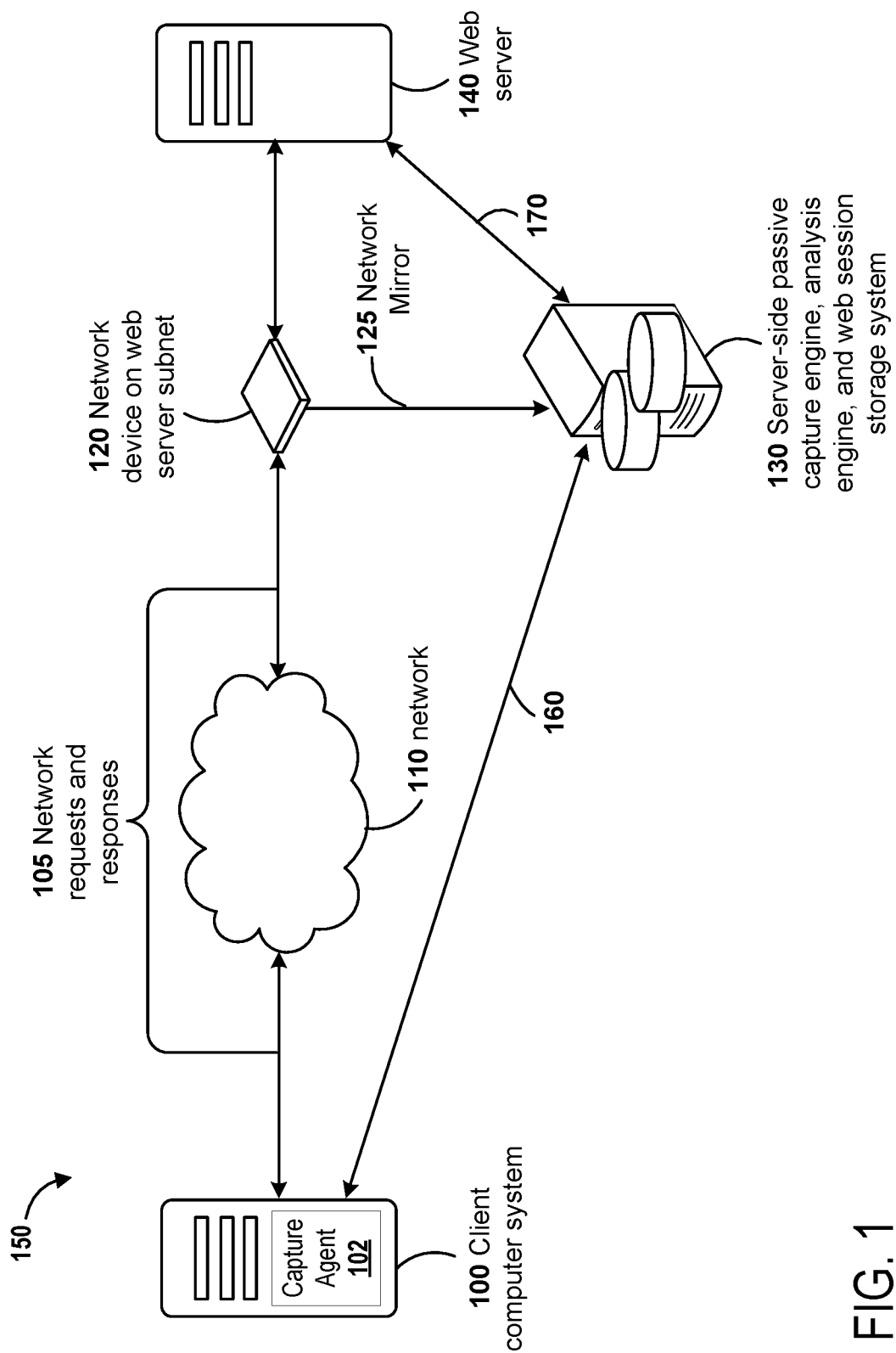
FIG. 1 illustrates a high level architectural diagram of a system according to some embodiments.

FIG. 1 illustrates a high level architectural diagram of a system 150 providing compact data storage of network traffic and efficient search thereof according to some embodiments. One or more of the below-described techniques may be implemented in or involve one or more computer systems. The computing environment in FIG. 1 is not intended to suggest any limitation as to scope of use or functionality of described embodiments.

The system 150 may include one or more client systems 100 (e.g., a client computer system) and a computer system (e.g., a web server 140). Client computer system 100 can communicate with web server 140 to exchange data via one or more communication networks (e.g., a network 110). Examples of a communication network include, without restriction, the Internet, a wide area network (WAN), a local area network (LAN), an Ethernet network, a public or private network, a wired network, a wireless network, and the like, and combinations thereof. Communications between client computer system 100 and web server 140 may include one or more requests and/or one or more responses (collectively "requests and responses" 105). A communication session (e.g., a web session) may be established between client computer system 100 and web server 140 to exchange communications (e.g., requests and responses 105) via network 110. In some embodiments, client computer system 100 may communicate with web server 140 by transmitting a request 105 along network 110 to web server 140. For example, a request from client computer system 100 to web server 140 may be a request for a web page accessed from a URL at client computer system 100. A response 105 from a web server 140 to client computer system 100 may be a response providing the web page requested by client computer system 100. The communications exchanged in system 150 may be transmitted via one or more data packets. Data packet(s) that are received may be reassembled to yield a communication, such as a request or a response. Requests and responses 105 may be transmitted via one or more network devices, e.g., a network device 120. For example, network device 120 may be the last network device in the communication of data from client computer system 100 to web server 140.

Requests and responses 105 may include data that comprises one or more electronic content items. A content item may be one or more types of content, including, but not limited to, electronic data corresponding to text, an image, a video, audio, other electronic media content, or the like. Data may be unstructured, structured, or a combination thereof. A content item may be defined based on one or more formats. A content item may be defined as having a format using, without limitation, hypertext markup language (HTML), cascade style sheets (CSS), Javascript, or other formatting techniques and languages. A format may indicate a style for displaying content. As such, data may include style format data that indicates a format of a content item. Data may be formatted according to a communication protocol used for transmission of the data.

Requests and responses 105 may include data, such as consumer data and/or enterprise data. Enterprise data may be received from an enterprise computer system, data sent to an enterprise computer system, data processed by an enterprise computer system, or combinations thereof. The enterprise data may be distinguishable from consumer data for consumer applications and/or services. In certain embodiments, enterprise data may include data processed, stored, used, or communicated by an application or a service executing in an enterprise computer system. For example, data in a communication may include business data (e.g., business objects) such as JSON (JavaScript Object Notation) formatted data from enterprise applications, structured data (e.g., key value pairs), unstructured data (e.g., internal data processed or used by an application, data in JSON format, social posts, conversation streams, activity feeds, etc.), binary large objects (BLOBs), documents, system folders (e.g., application related folders in a sandbox environment), data using representational state transfer (REST) techniques (referred to herein as "RESTful data"), system data, configuration data, synchronization data, or combinations thereof. In some embodiments, data in communications 105 may include a resource as referenced herein. A resource may include a document extended markup language (XML) files, HTML files (e.g., a web page), Javascript files, visual assets, configuration files, media assets, a content item, etc, or a combination thereof. For example, a resource may be a web page in an HTML format referenced at a URL. A BLOB may include a collection of binary data stored as a single entity in a database management system, such as an image, multimedia object, or executable code, or as otherwise known in the art.

System 100 can include a computer system 130 (e.g., a server-side processing and analysis engine and storage system) that performs techniques disclosed herein for providing compact data storage of network traffic and efficient search thereof. Computer system 130 may be implemented as part of either of both of client computer system 100 or web server 140. Computer system 130 may be communicatively coupled (e.g., via a network) to one or more elements in system 100. For example, computer system 130 may be communicatively coupled to client computer system 100 via connection 160. Computer system 130 may be communicatively coupled to web server 140 via network 110.

Computer system 130 may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Computer system 130 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. Computer system 130 may be implemented using hardware, firmware, software, or combinations thereof. In one example, computer system 130 may include or implement a service or a product (e.g., a computer program product) provided by Quantum Metric® Corporation. In various embodiments, computer system 130 may be configured to run one or more services or software applications described in the foregoing disclosure. For example, computer system 130 may perform processing as disclosed herein according to an embodiment of the present disclosure.

In some embodiments, computer system 130 may be implemented using a cloud computing system comprising one or more computers and/or servers that may include those described above. Computer system 130 may include several subsystems and/or modules, including some, which may not be shown. Computer system 130 may have more or fewer subsystems and/or modules than shown in the figure, may combine two or more subsystems and/or modules, or may have a different configuration or arrangement of subsystems and/or modules. Subsystems and modules of computer system 130 may be implemented in software (e.g., program code, instructions executable by a processor), in firmware, in hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes disclosed herein. Computer system 130 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

Computer system 130 may provide other services and/or software applications in a virtual or non-virtual computing environment. For example, computer system 130 may be configured to run one or more of these services or software applications described in the foregoing disclosure. Such services may be offered on-demand to users of client computer system 100. In some embodiments, a specific instantiation of a service provided by computer system 130 may be referred to herein as a "service." Users operating client computer system 100 may use one or more applications to interact to utilize the services or applications provided by computer system 130. Services may be offered as a self-service or a subscription. Users can acquire the application services without the need for customers to purchase separate licenses and support. Examples of services may include a service provided under a Software as a Service (SaaS) model, a web-based service, a cloud-based service, or some other service provided to client computer system 100 via network 110. A service made available to a user via network 110 (e.g., a communication network) from computer system 130 is referred to as a "cloud service." In some embodiments, computer system 130 may host an application, and a user may, via network 110, access the application at client computer system 100 on demand. Users operating client computer system 100 may in turn utilize one or more applications to interact with client computer system 130 to utilize the services provided by subsystems and/or modules of client computer system 130.

In some examples, a service may be an application service may be provided computer system 130 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in computer system 130, which may be implemented as a cloud computing system. The cloud computing system may be implemented as a cloud-based infrastructure that is accessible via network 110. Various different SaaS services may be provided.

Computer system 130 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, computer system 130 may be coupled to or may include one or more data stores. The data store(s) may store templates, edit scripts, and other information for the operations disclosed herein. The data store(s) may be implemented to store data using one or more data structures (e.g., a hash table). The data store(s) may be accessible to perform search and retrieval of data stored in the data store(s). It may also include analysis logic to select a template for responses as well as logic to store the edit scripts with respect to the template, as exampled and described in some embodiments below. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

One or more techniques may be implemented to enable computer system 130 to obtain data communicated via network 110. For example, data is communicated between client computer system 100 and web server 140 for a web session. In at least one embodiment, data packets communicate via network 110 may be network mirrored (i.e., duplicated and sent) via a computing device (e.g., a network tap 125) to a computer system 130. Network tap 125 can be a hardware device which captures the data communicated between client computer system 100 and web server 140. Network tap 125 may be part of or communicatively coupled to computer system 130. In at least one embodiment, system 150 may include an agent 102 ("capture agent") that can capture data communicated in system 150. Agent 102 may be an application that resides on client computer system 100, web server 140, or both. For example, agent 102 may be a java script that is embedded in a web page of a web site that can identify and obtain data that is displayed at client computer system 100. Agent 102 can be sent in communications 105 to client computer system 100. Agent 102 may communicate with computer system 130 to store data that is captured. In some embodiments, where web server 140 is operating in a network environment without administrative control of the localized network device 120, in lieu of a network tap to capture data communications, agent 102 may operate on web server 140 to send data communicated to computer system 130 via connection 170.

Once web server 140 receives a request from client computer system 100, web server 140 can create a response, in part based on information provided by client computer system 100. The response can be returned to client computer system 100. In some embodiments, as described above, data communicated in system 150 may be captured, either via network tap 125 or forwarded by agent 102, and reassembled into a communication (e.g., a response or a request).

Web server 140 may be operated by a user (e.g., an administrator) to access network traffic gathered by computer system 130. Computer system 130 may provide a service or an application that enables a user to perform efficient search and retrieval of network traffic stored in system 150. Techniques for search and retrieval are disclosed herein below.

Now turning to FIGS. 2-8, examples of compact data storage of network traffic and efficient search thereof are described according to some embodiments. These example are described with reference to FIG. 1. Examples disclosed herein may be described as a process, which may be depicted as a flowchart, a flow diagram, a data flow diagram, a structure diagram, a sequence diagram, or a block diagram. Although such diagrams may describe operations as a sequential process, all or some of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes disclosed herein, such as those described with reference to FIGS. 2-8, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by computer system 130 in system 150. The particular series of processing steps in this disclosure are not intended to be limiting. Other sequences of steps may also be performed according to alternative embodiments. For example, alternative embodiments of the present invention may perform the steps outlined above in a different order. Moreover, the individual steps illustrated in the figures may include multiple sub-steps that may be performed in various sequences as appropriate to the individual step. While processing depicted in FIGS. 2-8 may be described with respect to a single communication, such processing may be performed for multiple communications. Furthermore, additional steps may be added or removed depending on the particular applications. One of ordinary skill in the art would recognize many variations, modifications, and alternatives.

In an aspect of some embodiments, each process in FIGS. 2-8 can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

II. Network Traffic Storage

Figure 2:
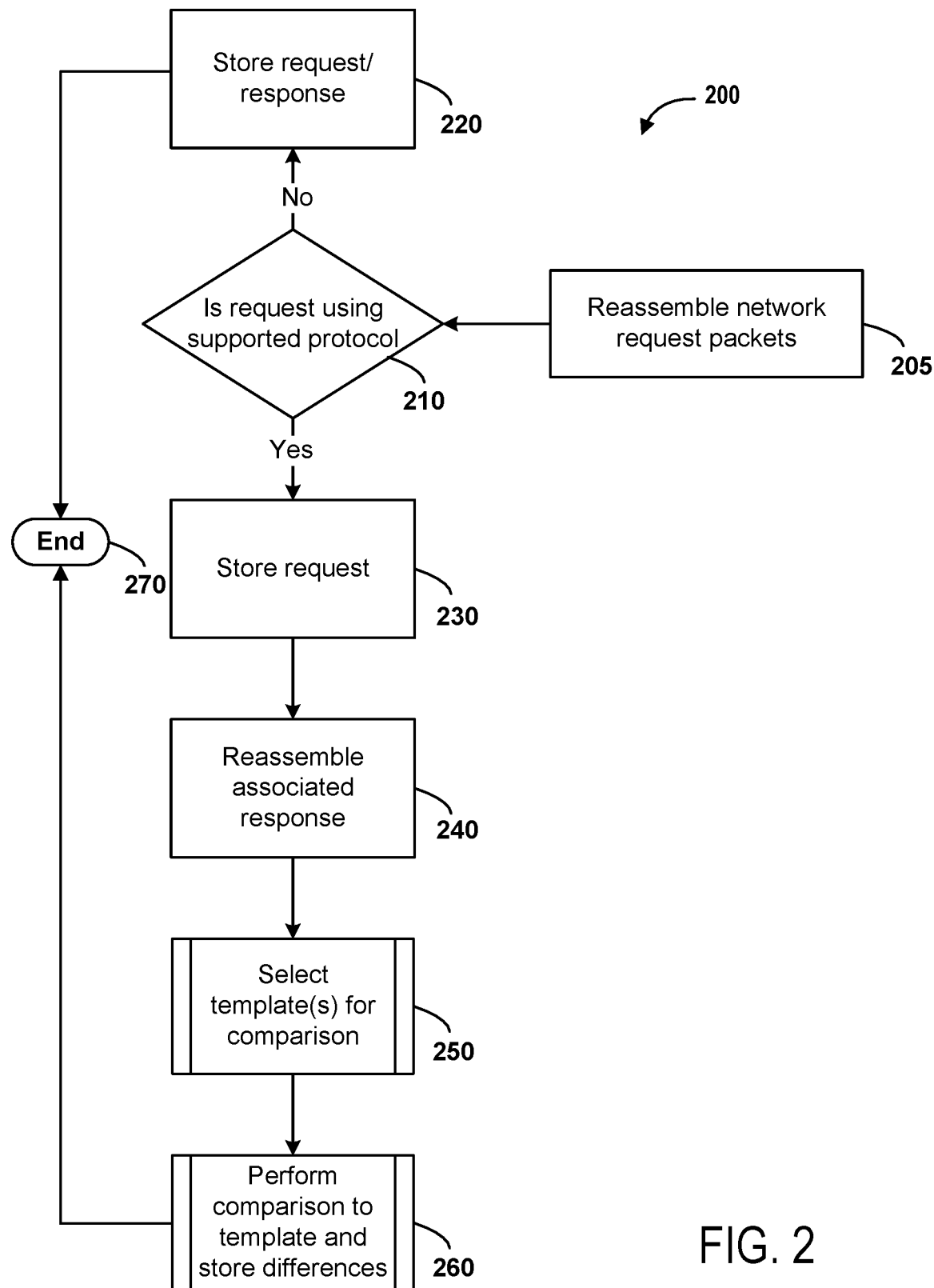
FIG. 2 illustrates an example high-level workflow of a process for processing network traffic according to some embodiments.

Now turning to FIG. 2 is an example that illustrates a high-level workflow 200 of a process for processing acquired network traffic according to some embodiments. In many applications used on the Internet today, much of the network traffic communicated in a network environment (e.g., a client-server model) is in responses transmitted by a server, e.g., web server 140. To improve efficiency of compression of data communications (e.g., response data), some embodiments disclosed herein may use techniques such as determining a similarity of transmitted data to previously transmitted data that has been stored, and storing the transmitted data based on assessment of the similarity. For example, all or a portion of the response data that is different from the previously stored response data may be stored. By storing the differences in the transmitted data, greater efficiency of compression of storage of the transmitted data can be achieved.

Workflow 200 can be implemented by computer system 130. Workflow 200 may begin at step 205, by processing one or more data packets (e.g., request packets) captured for a network communication. The processing of request packets may include processing known in the art to identify data corresponding to responses and requests. For example, the captured network packets may be reassembled to generate request and/or response data that is transmitted between a client computer system (e.g., client computer system 100) and a server (e.g., web server 140). By performing such processing, computer system 130 can isolate data corresponding to requests and responses in a client-server model. Data packets may be reassembled based on known techniques upon determination that the data packets are transmitted using a supported communication protocol.

At step 220, a determination is made whether a communication (e.g., a request or a response corresponding to one or more data packets) is transmitted using a supported communication protocol. Examples of supported communication protocols include, without restriction, network communication protocols such as HTTP, HTTP/2, SPDY, and File Transfer Protocol (FTP). Supported communication protocols may support use of a request identifier or so other field, such that communications that are related or similar can be grouped based on the request identifier or a common field. An example of a request identifier is a universal resource identifier (URI) supported by protocols HTTP, HTTP/2, SPDY, and FTP. In some embodiments involving use of HTTP, HTTP/2, SPDY, or FTP, a URL in a request is used as the unique request identifier. Other communication protocols may be similarly supported and thus this list is to be viewed as non-exhaustive.

A determination as to whether a communication is using a supported communication protocol may be based on information in a data packet that is captured for the communication. A data packet may be examined to determine whether it includes a request identifier or some other data defined by a supported communication protocol. For example, a determination may be made that a data packet of a communication is transmitted using a supported communication protocol based on determining that the data packet has an identifiable field or a request identifier of the supported communication protocol. Upon determining that a communication is transmitted using a supported communication protocol, workflow proceeds to step 230. Upon determining that a communication is not transmitted using a supported communication protocol, workflow 200 proceeds to step 220.

At step 220, upon determining that a communication (e.g., one or more data packets) are not transmitted using a supported communication protocol, the data packets corresponding to the communication (e.g., a response or a request) are stored in their entirety for future use. Workflow 200 proceeds to 270 where it ends.

Upon determining that a communication is transmitted using a supported communication protocol, at step 230, the data packets corresponding to the communication are stored. In some embodiments, data corresponding to a request can be normalized for storage using relational database techniques known to one skilled in the art. Generally most communications can be very structured and/or repetitive. For example, HTTP requests may include common fields that are reused from one request to the next request, such that a browser name can be reused over multiple HTTP requests. As such, greater compression can be achieved by de-duplicating fields where there is common data that is often repeated across multiple requests.

At step 240, the data packets corresponding to a communication can be processed to reassemble a communication (e.g., a response or a request). In some instances, the majority of communications between a client and a server are responses, not requests. In such instances, the data packet(s) corresponding to a request may simply be stored without subsequent processing to determine the request. Whereas response data may comprise many data packets, the data packets corresponding to a response may be reassembled to determine the response. Data packets may be reassembled using techniques known by a person skilled in the art, such as disclosed herein with respect to responses.

At step 250, one or more templates (e.g., resource templates) may be selected for comparison with data (e.g., one or more data packets) corresponding to a communication (e.g., a response). The communication may be the one identified from data packets reassembled at step 240. One or more templates of data may be previously stored, where each template is stored for a distinct communication (e.g., a response or a request). A template may store data defining a resource transmitted in a distinct communication. As discussed below, computer system 130 can store a template of data obtained from data for a distinct communication (e.g., a response or a request). The templates may be selected for comparison with a communication to determine whether all or part of the communication matches a template.

In at least one embodiment, a template may be selected for the comparison based on an identifier in the data of the communication being compared. For example, a URL identified in the communication (e.g., a URL in an HTTP request) may be used to select one or more templates for the comparison. In this example each of the templates may be stored based on a common part of the URL (e.g., a URL for a website). This example is further detailed with respect to FIG. 3. In some embodiments, a template for a communication may be stored with unique information (e.g., an identifier) from the communication. As such, one or more templates may be selected using information in the communication (e.g., a type of communication) that is related or common with the unique information identifying a template. In some embodiments, one or more templates may be selected using document similarity matching techniques disclosed herein. In yet other embodiments, one or more templates may be selected for comparison using one or a combination of techniques disclosed herein, such as through use of an URL or other information in the communication.

At step 260, a determination is made whether the information in a communication (e.g., a response or a request) matches all or part of one or more templates selected at step 250. The template(s) may be identified at step 250. The determination may include performing a comparison between a template and the information in the data corresponding to a communication. The comparison may be performed by applying a comparison algorithm (e.g., Meyer's diff algorithm) or a similarity matching algorithm. The comparison may include determining a measure of similarity to the template that is compared. Based on the comparison, a template can be identified that matches all or a part of the information of the communication. In some embodiments, a template may be selected based on the degree (e.g., a measure of similarity) to which the template matches the information of a communication. For example, a template may be selected from among multiple templates based on the template having the best match (e.g., a greatest measure of similarity or least amount of differences) with the information of the communication. In another example, a template may be selected based on a measure of the similarity satisfying a threshold for comparison (e.g., a similarity threshold).

At step 260, based on the comparison, a determination is made as to the differences between the template and the information in the communication. The differences in the communication may be stored. The differences may be stored in association with the template and with information indicating the communication. In some embodiments, the differences may be stored as a new template in association with the template. As discussed below, the template and the differences may be used to recreate the communication at a later time without storing the entire contents of the communication. The process described with reference to step 260 is further detailed with respect to FIG. 5.

Workflow 200 proceeds to end at step 270.

III. Resource Templates and Edit Scripts

A. Resource Template Identification and Generation

Figure 3:
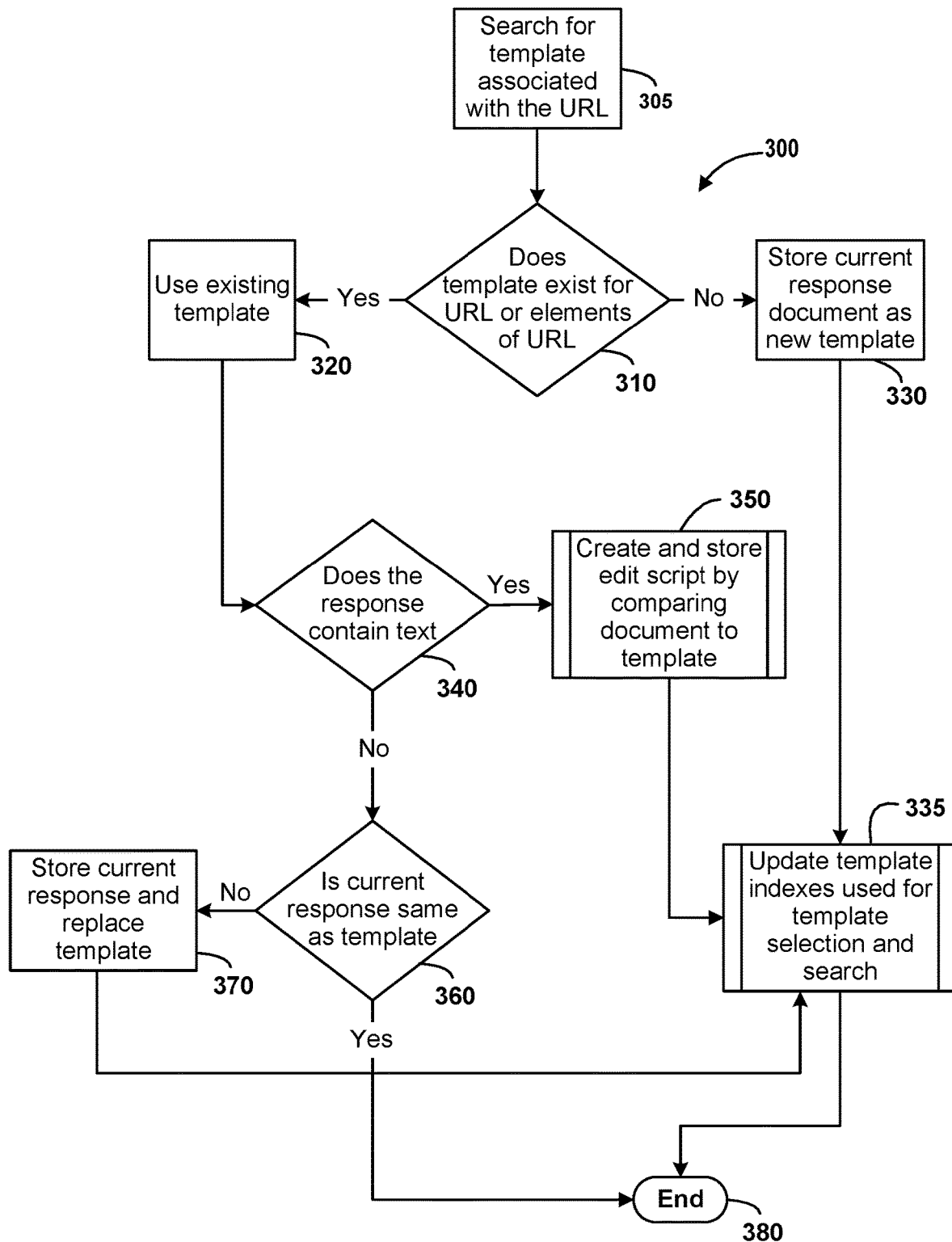
FIGS. 3 and 4 illustrates examples of workflows of processing for storing network traffic according to some embodiments.
Figure 4:
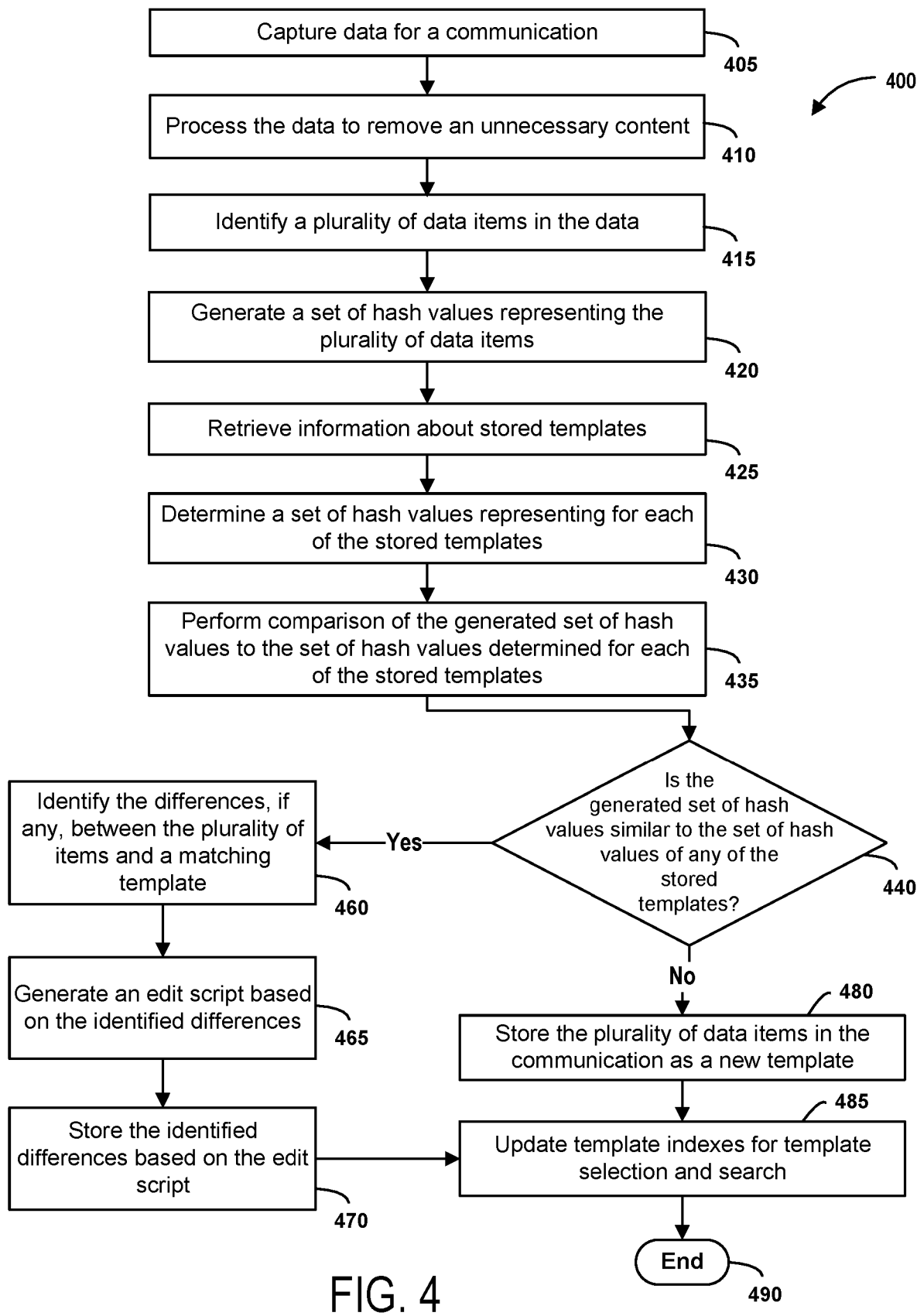

FIGS. 3 and 4 illustrate examples of workflows of processing for storing network traffic according to some embodiments. In some embodiments, network traffic (e.g., data packets of a communication) may be stored as a template or as a compressed edit script. A template or a script for storing network traffic may be stored based upon an identifier. The identifier may be based on information that is unique to a communication that is being stored. For example, the identifier may be a resource identifier (e.g., a URL) that is obtained from the data representing the communication. Some embodiments make use of the general condition of web server applications serving very similar responses having a communication resource identifier, which may be part of a URL. A resource identifier associated with a template may be used to match the template to a communication having the resource identifier as part of a URL in the communication. A matching template can be compared to the communication for determining compact storage of data for the communication. Thus, matching the correct template can be important in achieving compression to prevent duplicate storage of network traffic that has been stored.

In FIG. 3, workflow 300 illustrates is an example of a process for storing network traffic. Workflow 300 begins at step 305, by searching for a template that matches information in a communication of network traffic (e.g., a request or a response). The information may be the URL or elements of the URL in the communication. As discussed above, system 150 may store a plurality of different templates for compact storage of network traffic. The search may be performed on the plurality of templates. In illustrative example, if a web client performs a request and a server supplies a response for "index.html" of a website, the system uses the full URL "index.html" to look for an existing "index.html" template. If the request is for "controller.jsp?action=view_account&location=CO", a portion "action=view_account" in the request is used to search for a matching template. The parameter value "view_account" can be most useful in the unique identification of templates created based on similar responses. Similarly, one embodiment may use other fields provided in the request, such as POST data, instead of solely the URL. Additionally, yet some embodiments may forgo elements in the URL and use document similarity matching to search for a template that closely matches information in a communication of network traffic, the process of which is described herein.

At step 310, a determination is made whether a template exists for the URL or elements of the URL. Upon determining that a template exists for the URL or elements of the URL 310, workflow 300 proceeds to step 320, where the template identified based on the search at step 305 is further used for processing in workflow 300 as described below.

Upon determining that a template does not exist for either of the URL or elements of the URL, workflow 300 proceeds to step 330, where the information in the communication may be stored. For example, the URL or elements of the URL obtained from the communication may be stored as a new template in association with the information in the communication. Proceeding from step 330, at step 335, the new template may be stored in association with a template index along with other template indexes for the existing templates. For example, the storage of template indexes for existing templates may be updated with a template index for the new template created at step 330. The template indexes may be used to search for templates. Further details about storage and indexing of templates is described below, in particular with reference to FIG. 7. Workflow 300 may proceed to end at 380 after step 330.

Now returning to step 320, the template identified based on the search as matching the URL or elements of the URL may be selected. Upon selection of the template, at step 340, the communication based on which the URL or the elements of the URL are obtained from is processed to determine whether the communication includes content, such as text.

Information in the communication, such as such as the HTTP headers, may be used to identifying the content type as text. Other indicators such as introspection into the body of the communication may be utilized to assess the content in the communication. One example is checking the content-type field in an HTTP header for indications that the communication includes text. Examples of a content-type field in a communication includes text/html, text/plain, text/rtf, text/css, text/Javascript, text/xml, application/JSON, application/Javascript, application/xml, etc. In another example, the communication may be scanned to determine if the communication includes invalid character values, which may indicate a binary response. In some embodiments, the communication may be processed to parse one or more data items (e.g., tokens of data) in the content. The communication may be parsed using one or more delimiters, such as characters. Delimiters may be chosen based on a format of the communication. It may be determined that the communication does not include text based on determining that the communication includes binary data.

Text resources on websites such as HTML, JavaScript and CSS are likely to be communicated with a limited amount of changes to the document. In contrast, binary documents, such as images and fonts, are more likely to be changed in more numerous, larger areas, since even small visual changes can lead to widespread changes in the binary file representation due to the nature of these formats. Compression by storing only the changes is less likely to be effective when changes are numerous and larger. Binary documents are often unchanged for long periods of time, and thus a simple comparison to detect changes may be more efficient. Text content may be compressable by storing differences when compared to a template, while the entire binary content may be best stored when any changes are detected. In some embodiments, some text documents in communications may not be stored, rather focusing only on communications including documents of interest, such as Hypertext Markup Language (HTML) response documents. In some embodiments, all binary data in communications may not be and only communications may be analyzed for text response documents.

Upon determining that a communication includes content, such as text, an edit script may be created by comparing the communication to the template selected at step 320. The edit script mat be stored. This process is further detailed below, particularly with respect to FIG. 5. From step 350, workflow may proceed to step 335 to update the templates indexes as described above.

Upon determining that a communication does not include content, such as text, the communication may be compared with the template selected at step 320 to determine whether content in the communication is similar or identical to the template. In some embodiments, the communication may be compared to the template by such means as comparing a hash of the communication to a hash of the template.

Upon determining that content in the communication is not similar or identical to the template at step 360, workflow proceeds to the step 370. At step 370, the communication may be stored as a new template. The template may be replaced each time a binary change is detected with content stored in the template. Workflow 300 may proceed to step 335 to update the template indexes based on the new template stored for the content in a communication.

Upon determining that content in the communication is similar or identical to the template, workflow 300 may proceed to end at step 380. Thus, when a communication is similar or identical to a template, the communication may not be stored, thereby reducing the total storage of communications. Such compact storage of communications may improve storage compression by upwards of 99%, as only metadata about the transmission (e.g., a timestamp, IP address, and other header values) may be stored (although in some embodiments even this metadata is not stored).

Now turning to FIG. 4 is an example of a workflow 400 of another process for storing network traffic. Starting at step 405, network traffic may be captured for communications. In particular, data may be captured for a communication comprising one or more data packets. Data may be captured using techniques disclosed here, such as those described with reference to FIG. 1. In some embodiments, data in a communication may be identified in the one or more data packets which comprise the communication. The data in a communication may include a resource (e.g., a web page). As such, the data may include content, which may define the resource. The data for a communication may include metadata, or other information in addition to a resource.

At step 410, the data representing a communication may be processed to remove unnecessary content. Unnecessary content may include content that does not define a resource in the communication. For example, unnecessary content may include metadata or formatting data of a resource in the communication. The unnecessary content may be identified and extracted using techniques known by a person skilled in the art. For example, content to be removed may be identified and extracted by parsing data representing a communication. Unnecessary content such as metadata may be identified based on a known format of a communication protocol. Unnecessary content such as format data may be identified based on a format of the resource that is requested. Removing unnecessary content may assist in the identification of a resource included in a communication. As such, the comparison of the content of a resource can be easily compared with existing templates as disclosed herein when unnecessary content is removed.

At step 415, a plurality of data items are identified in the captured data. Each of the plurality of data items may form a portion of content in the communication. The content may be a resource, such as a web page. In some instances, one or more of the data items may include formatting of the content. In some embodiments, a plurality of data items may be a plurality of tokens identified by parsing content in a communication. A plurality of data may be identified by implementing techniques disclosed herein. For example, a plurality of data items may be identified by parsing the content using one or more delimiters by implementing techniques described with reference to FIGS. 3 and 5.

In at least one embodiment, content in a communication may be parsed to identify a plurality of data items (e.g., a plurality of tokens), each data item corresponding to a token of data. For example, when content is a text document, the plurality of data items may be identified by parsing the content using one or more delimiters. Where content is an HTML document, delimiters such as a space (' '), '<', and '>' may be used to parse the content to identify the plurality of data items. Delimiters may be chosen to optimize computing performance. The choice of delimiters may impact processing performance during processing for comparison of content to templates. The choice of delimiters may be based on the type of content and/or format of content (e.g., HTML or Javascript).

At step 420, a set of hash values may be generated to represent the plurality of data items. The set of hash values may be generated using a hashing algorithm. In some embodiments, the hashing algorithm is a minimum hashing ("MinHash") algorithm, which can be used to determine the similarity of two data sets. Techniques for comparing data sets are disclosed herein for determining the similarity of the plurality of data items in a communication compared to one or more stored templates. As part of determining the similarity of two data sets, a set of hash values may be generated for the plurality of data items to be compared later to one or more templates.

In at least one embodiment, a min hash algorithm may be implemented to generate the set of hash values for the plurality of data items. The set of hash values may correspond to the set of minimum hash values generated for the plurality of data items for implementing the min hash algorithm. Initially, a shingle length value may be determined, where the shingle length value is a value that defines a group of data items of the plurality of items, the group being the number of consecutive data items of the plurality of data items that will be processed using the algorithm. Determination of shingle length value may be based on processing performance considerations, such as the size of content defined by the number of data items. One or more hashing algorithms may be performed against each of the data items in a group of data items defined by the shingle length value. The number of hashing algorithms applied to a group of data items may be based on processing performance considerations, such as processing performance for comparison of content with a template. The hashing algorithms may be applied to each of the data items in all of the groups of data items identified based on the shingle length value.

Upon determining a shingle length, one or more groups of data items are identified in the plurality of data items based on the shingle length. Each group of data items is identified based on the shingle length value as one or more different consecutive data items in the plurality of data items. For example, a group of data items may be five consecutive data items when the shingle length value is five. For each group of data items, one or more hashing algorithms are performed for each data items in the group of data items defined by a shingle length value. In at least one embodiment, for the number of hashing algorithms applied to each group of data items, each of the hashing algorithms may be applied to each data item in the group. The result of the application of the hashing algorithms to a data item are used as a seed to the next data item. The result of applying the hashing algorithms to the next data item is used as a seed for the next data item and so on in the group of data items until the group of data items are processed for the hashing algorithms. As an example, the shingle length is five and the number of hashing algorithms is 100. For a group of five data items (e.g., five tokens), a 100 hashing algorithms will be applied to each token, taking the resulting value of each and applying it to the next token in the group. So in other words, 500 hashing algorithms will be applied across the five tokens in the group.

In some embodiments, for each one of the different hashing algorithms applied to each data item in the group of data items, an algorithm (e.g., a themed algorithm) may then be applied such that a minimum hash value of each of the data items, based on application of the hashing algorithms to the group, will be generated across all of the data items in the group. The themed algorithm may be applied to each of the next groups of data items. A set of hash values may be determined for each of the plurality of data items. The set of hash values may be the minimum hash values generated for each of the data items of the groups of data items.

In some embodiments, the generated set of hash values may be transmitted from one computer (e.g., client computer system 100) to another computer (e.g., computer system 130). The set of hash values may be generated at client computer system based on data obtained by client computer system 130. As such, to minimize sending all of the data of a communication to computer system 130, client computer system 100 may send the generated set of hash values, which can be used for comparison with templates stored by computer system 130 as further detailed below. By sending the set of hash values instead of the content in a communication, the amount of bandwidth consumed is minimized for retransmission of content for template generation. In other words, client computer system 100 can minimize use of network bandwidth by sending the generated hash values instead of the actual content, which may consume more bandwidth.

At step 425, information about stored templates, if any are stored, may be retrieved. The information may identify a location of the templates. As discussed above, a template may include content extracted from a communication. The content may be one or more data items (e.g., tokens) that are parsed from the communication. A data store with the templates may be accessed to obtain the data identifying the templates.

In some embodiments, templates may be identified based on information in the communication. For example, templates may be identified based on a URL or an element of a URL in the communication as described with reference to step 305 of FIG. 3. Using information in the communication to identify templates may improve processing performance by reducing the number of templates to compare with the data in the communication.

At step 430, a set of hash values may be determined for each of the templates. A set of hash values for the template may be generated using a hashing algorithm as applied at step 420. In some embodiments, the set of hash values generated for a template may be stored in association with the template. The set of hash values for the template may be generated when the template is created. In some embodiments, the set of hash values for the template may be generated at the first instance the template is used for a comparison with content in a communication, by applying the same hashing algorithm to the one or more data items in the template. As will be explained below, the set of hash values for each template can be compared to the set of hash values generated for the content in the communication.

At step 435, a comparison is performed between the set of hash values generated at step 415 and the set of hash values for each of the templates. Any number of comparison techniques may be applied as known by a person skilled in the art. A result may be generated based on the comparison. A result value may be generated that indicates a measure of the difference or the similarity between the content in the communication and the template. A result may indicate the value(s) that are different between the sets of hash values that are compared.

At step 440, a determination is made whether the generated set of hash values is similar to any of the set of hash values determined for the templates. A determination that the sets of hash values may be similar may be based on whether the sets of hash values match exactly. A similarity metric analysis may be performed to determine a similarity metric. The similarity metric may be computed using one or more of a Jaccard Index or other method of similarity analysis known to a person skilled in the art. One or more comparison criteria may be defined for comparison of the sets of hash values. The criteria may be selected to achieve a desired balance of compression with respect to storage. The similarity analysis can be assessed based on the criteria to determine whether the sets of hash values are similar. For example, the comparison criteria may include a similarity threshold (e.g., a value defining a percentage of similarity). The result (e.g., similarity metric) of the similarity analysis may be assessed in view of the similarity threshold, such that the sets of hash values may be deemed similar when the similarity threshold is satisfied.

More criteria or criteria (e.g., a higher similarity threshold) that are harder to satisfy may achieve better compression per communication, but may result in additional storage as new templates are likely to be created. Less strict criteria (e.g., a lower similarity threshold) may result in use of less template storage but less effective compression per communication. In some instances, data in a communication may be closely similar to a template, such that a similarity threshold may be defined so data that matches with a certain degree of similarity to templates are not promoted to templates, as to prevent storage of closely similar templates.

Upon determining that the generated set of hash values does not match the set of hash values of any of the templates, workflow 400 proceeds to step 480. Upon determining that the generated set of hash values does match the set of hash values of any of the templates, workflow 400 proceeds to step 460.

At step 480, the plurality of data items in the communication may be stored as a new template upon determining that the plurality of data items does not match a template. A new template may be created and stored as described with reference to step 330 of FIG. 3. The generated set of hash values may be stored in association with the template. As explained above, the set of hash values may be used later for comparison with a set of hash values generated for content in a new communication.

At step 485, the new template may be stored in association with a template index along with other template indexes for the existing templates. For example, the storage of template indexes for existing templates may be updated with a template index for the new template created at step 480. The template indexes may be used to search for templates. Further details about storage and indexing of templates is described below, in particular with reference to FIG. 7. Workflow 400 may proceed to end at 490 after step 485.

In some embodiments, a measure of similarity or difference may be determined between the sets of hash values that are compared at step 435. Although the set of hash values does not match the set of hash values of any of the templates, the plurality of data items in the communication may have some similarities with a template.

Now returning to step 460, upon determining that the generated set of hash values does match the set of hash values of any of the templates, the plurality of data items is compared to the template for which the set of hash values has a similarity. The differences, if any, may be determined between the plurality of data items and the content in the template. The differences may be determined using techniques such as those disclosed with reference to FIGS. 2, 3, and 5. In some embodiments, a diff algorithm (e.g., Meyers diff algorithm) may be applied to identify the differences between the plurality of data items and the template.

At step 465, an edit script may be generated based on the differences identified at step 460. The edit script mat be generated using techniques disclosed herein with reference to FIGS. 2, 3, and 5.

At step 470, the edit script may be stored for the identified differences. The template may be updated with the differences in the edit script. In some embodiments, the edit script may be stored in association with the template which was identified as being similar at step 440. Storing the edit script in association with the template enables future similarity analysis to consider the edit script in the event that data in a communication matches content in the template and the edit script.

From step 470, workflow 400 proceeds to step 480 where the template indexes are updated for the template. In some embodiments, the template indexes may be updated to include a reference to the edit script associated with the template.

Workflow 400 ends at step 490.

B. Edit Script Generation

Figure 5:
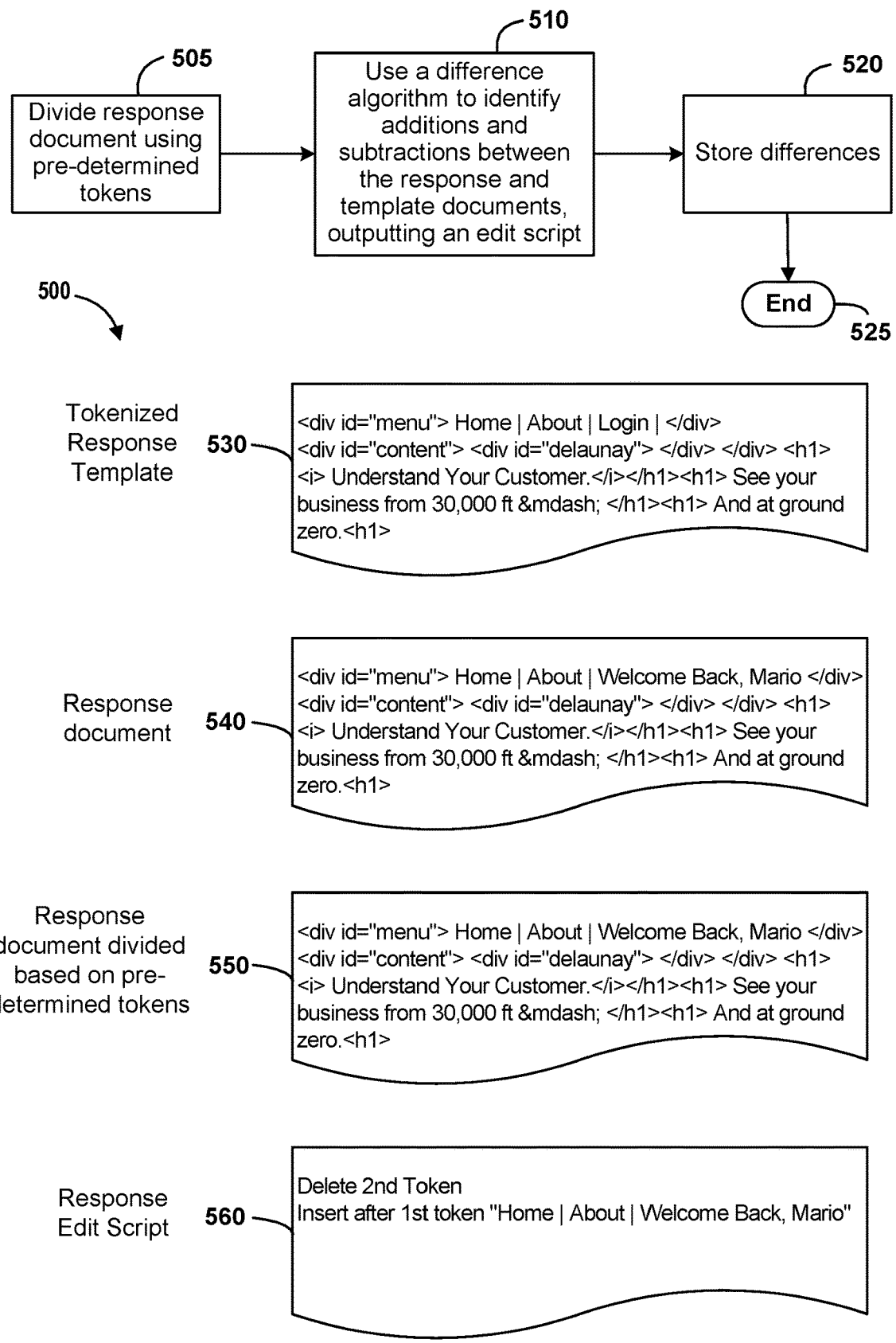
FIG. 5 illustrates an example workflow for the creation of an edit script according to some embodiments.

FIG. 5 illustrates an example workflow 500 of a process for the creation of an edit script based upon a template document and content (e.g., a document) in a communication (e.g., a response or a request) according to some embodiments. Where a communication has text, most of the content of the communication will be similar between computer systems requesting the content (e.g., requesting a web page for the same URL). However, some communications from web servers may serve dynamic data and responses that differ by varying amounts. In order to efficiently identify and store changes of the content between communications, some embodiments may perform a comparison of the content in a communication to a document template, selected using techniques disclosed herein. As discussed above, a template may store content from previous communications. The comparison may occur using a set of data items (e.g., tokens) that are identifiable in the content of the communication. A data item may include one or more characters, such as a string of characters. The characters may be identified as a token. A set of tokens in a communication may divide the content in a communication. Comparing content in a communication to a template can enable specific insertion, removal, and/or changes of any of the content in a concise format. Specifically, content that is tokenized may be easily compared and stored.

Workflow 500 may begin at step 505 by parsing content in a communication. Content in a communication may represent a resource. For example, a document identified in a communication may be a resource that is requested from a web server, In some embodiments, content in a communication may be parsed using one or more delimiters. A delimiter may be defined as a pre-determined token, such as the examples discussed below. The tokens used for parsing may be selected based on a format of the content. The parsed content may be useful for comparing content to a template. Care should be considered for determining the tokens to use for parsing content to ensure an optimal trade off of size and effectiveness of dividing the document. The use of too many tokens can lead to more work in processing and less meaning with regard to identifying like changes across multiple response documents. By using too few tokens, the difference algorithm results in modifications that are clustered in too large of a change to make the processing and compression efficient.

A document 540 is shown as an example of content received in a communication. In this example, the content shares the same URL as the template 530. Document 540 may include content that includes tags for formatting.

In one embodiment where the response document is a web text document, the tokens may include '<', '>', ';', '{', '}', '[', ']', ':', '\n'. A combination of tokens may be based on the above conditions, enabling a balance of the effects of the algorithm in capturing discreet changes in a resource having JavaScript, CSS, HTML, and web content. In some embodiments, parsing a document using tokens such as a space (' '), '<', or '>' may maximize CPU performance for parsing. Often, differences between requests to the same web page from multiple clients are due to content changes. For example, one user may have "Welcome back, Joe", while another user may have "Welcome back, Sally". To record the differences in a compact format, it is beneficial to compare the template to the content portions of a web document received in a communication. By selecting the appropriate tokens, the content can be separated from the formatting tags. A document 550 is shown as an example of the web response document of divided using the preferred tokens discussed above. By dividing content using the preferred tokens, the elements of the content can be easily compared to a template to enable an optimally short edit script to be created. By tokenizing the document in this format, the content is separated from the formatting tags.

At step 510, processing may be performed to compare the tokens for content in a communication to a template. A difference algorithm is performed for a comparison to identify additions and subtractions between the content and a template document. In some embodiments, a template may be processed into data items to aid in the comparison to tokens identified in content of a communication. A comparison may be performed by comparing the tokens parsed at step 505 to a template. A template 530 shown in FIG. 5 is an example illustrating tokens of content in stored in a template. A template may be created for content based on the data items parsed in content of a communication that is stored. By storing the data items identified using tokens, which exclude formatting, compact storage of communications may be achieved. Template 530 can be a fragment of an HTML document in a communication and includes tags and content parsed from the communication based on tokens. The creation of a template is described below with reference to FIG. 6.

In some embodiments, a comparison of content in a communication and a template may be performed by implementing a difference algorithm. The difference algorithm may use tenants of the Myers Difference Algorithm, although other similar difference algorithms may also be utilized. The method of implementing a difference algorithm is apparent to those skilled in the art.

At step 520, the differences determined at step 510 can be stored in a network storage system (e.g., computer system 130) for later indexing and/or retrieval. An edit script can (e.g., a shortest edit script (SES)) can be generated based on identifying differences between the content and the communication. The differences may be identified as the tokens that differ from the template. An edit script, when applied to the template, can reproduce the content in the communication. An edit script can be generated based on the differences identified by comparison of the tokens to the template. Generating an edit script based on the preferred tokens can allow for a reduced, if not minimal, amount of processing time to create the edit script while creating an optimally small edit script. There is a tradeoff between performance and resulting edit script size in the selection of tokens described above. The smaller the resulting segments from tokenization, the more processing time to create the edit script and reassemble the document. The larger the resulting segments, the larger the edit script will be upon even the smallest of changes.

FIG. 5 shows an edit script 560 resulting after a comparison between document 550 document and template 540. As only the content in the menu DIV tag changed, only that information is stored in the edit script. The edit script can contain a reference to the template used so that the original document could be reassembled. While the illustration shows the edit script in human readable format, the edit script may be stored in a more compact computer readable binary format well-known to one skilled in the art.

As described with reference to FIG. 4, a similarity analysis may be performed to determine a similarity value indicating the similarity, if any, between document 550 and template 540. The similarity value may be compared to a similarity threshold to determine whether the template should be updated with the edit script. In some embodiments, where the similarity threshold is not satisfied (e.g., the similarity value is less than the similarity threshold), the edit script may be stored in a new template. The new template may be stored in association with (e.g., chained to) template 540. The chained template may be indexed with the template 540, and therefore, may be considered in searches as disclosed herein.

In a future instance when a new document is received, upon determining that the new document is not similar to the template 540, the content of the new document may be compared to the template chained to template 540. A similarity analysis may be performed for a comparison of the new document and the combination of template 540 and the chained template. For example, the content in template 540 may be merged with differences in the chained template, the result of which is compared to the document. Upon determining there is a similarity based on the chained template merged with template 540, further processing can be performed to update template 540. For example, the chained template can be promoted as the new template for template 540, such that template 540 is updated with the differences in the chained template. In some embodiments, template 540 may be updated based on techniques disclosed with reference to FIG. 6.

Workflow 500 may end at step 525.

Some embodiments may reduce static content data storage by as much as 99%, varying with a dependence on the content generated per URL in dynamic documents, or the document similarity matching algorithm. With data storage for resources rarely changing, such as images or supporting client-side scripts, differences to previously capture data can be greatly reduced, resulting in zero-length edit scripts and storing only the metadata such as timestamp, TCP header information including IP address, transfer time, and other available information.

C. Resource Template Updating

Figure 6:
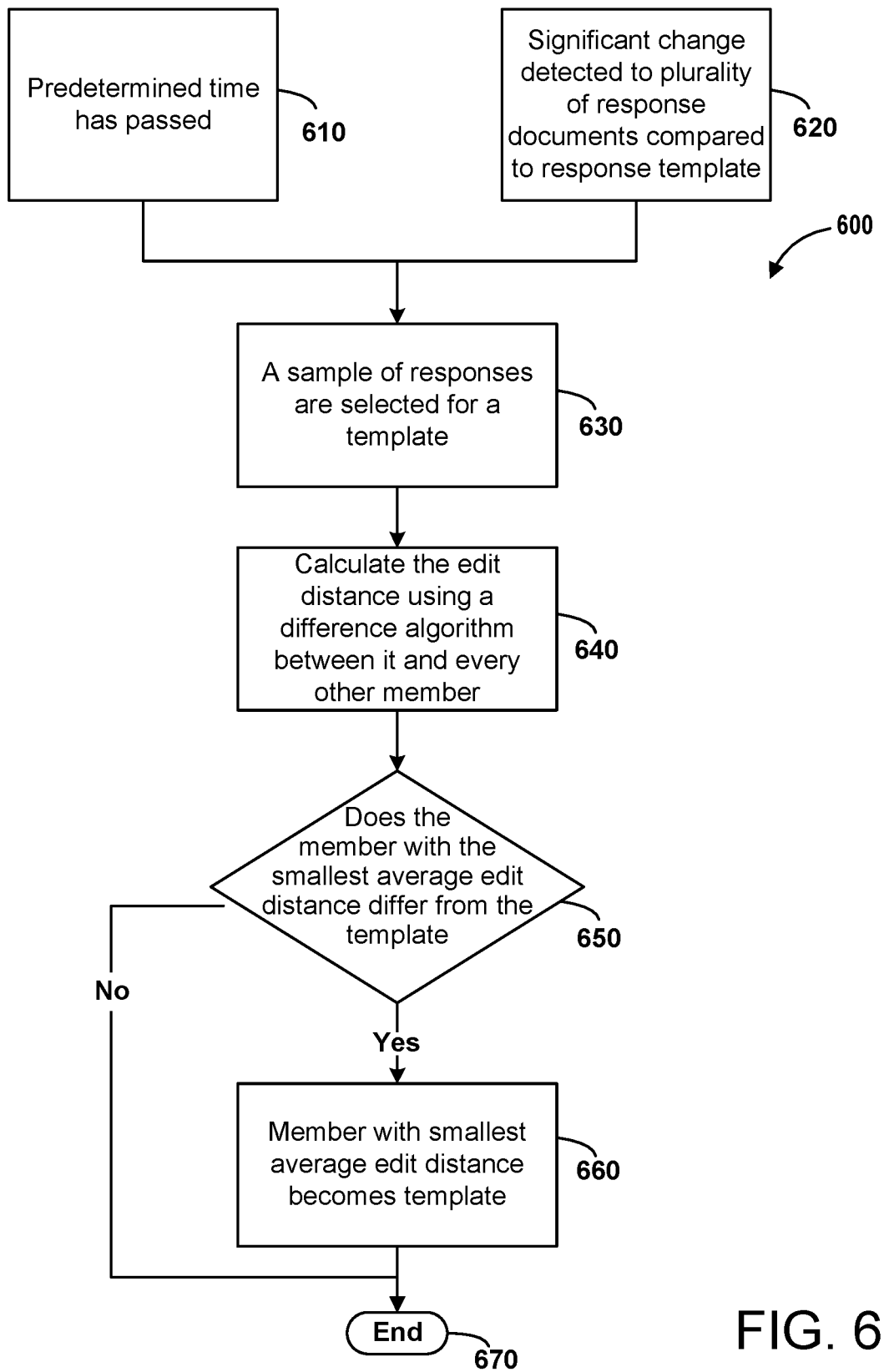
FIG. 6 illustrates an example workflow for updating a template according to some embodiments.

FIG. 6 illustrates an example workflow 600 of a process for updating a template used according to some embodiments. Templates may be stored in system 150. Computer system 130 can perform processing to review the templates periodically to ensure that the template covers common or frequently occurs portions of certain types of communications that may be captured. A template may be updated or replaced upon determining that one or more criteria (e.g., a change threshold, or a low document similarity match to the best matched document in a set of templates) have been satisfied. When a change threshold is reached, the system may be configured to choose a new template. For example, when a template for a resource (e.g., a web page of a web site) has changed a threshold amount in comparison to a document in a communication, the template may be updated or replaced with content corresponding to the changes in the resource. The template comparison enables the system to remain relevant and efficient.

Workflow 600 may begin at step 610 by determining that one or more criteria for a template has been satisfied. The one or more criteria may be defined for managing (e.g., updating a template). The one or more criteria may include a time period or a time interval, such as a hourly, daily, or weekly time period. For example, a determination may be made that a time period (e.g., a predetermined time) for a template has passed. Checking a template to determine whether it is current (e.g., covers common or frequently occurring content) may be computationally expensive, but may result in more current edit scripts. Thus, the selection of the time period may be flexibly configured according to the particular configuration and environment of the implementation.

Workflow 600 may begin at step 620 by determining that a threshold of change has been detected between content in a communication and a template. The change may be useful in determining whether to update the template, create a new template, or store the differences. As discussed above, a template may be selected based on matching a URL in a communication. Content, such as a web page, in a communication may be compared to the template to determine whether the web page has change. The threshold of change may be defined based on a threshold number of differences between content that is compared to a template. A comparison of the content to the template may be performed using techniques for comparison disclosed herein.

In one example, significant changes may be detected when comparing a document in a communication to the template. If the amount of change detected by the comparing is drastically different from previous comparisons, the amount of change may be a signal to reevaluate the template. For example, if edit scripts reflect a 10% difference of content compared to a template, but are now reflects a 50% difference of content, it may be advantageous to reevaluate the template used. This can happen, for example, when the content of a website is updated upon a new website release, or a previous template selection did not account for the entirety of varying types of possible content in communication about the website.

In some embodiments, the threshold amount of change for a template may be defined a size of an edit scripts (e.g., number of lines or number of bytes) that defines a significant change in content compared to the template. In such embodiments, when the size of an edit script exceeds a threshold value, then significant changes may be considered for the template.

In some embodiments, a threshold value for a template may be configured as a percentage of the raw document that has changed for the template. The percentage of the raw document may be defined as an amount of change for the template reflected by an edit script. The threshold value may be defined as the number of edit scripts that have been generated based on comparisons for the template. The number of edit scripts may be configured as a frequency of occurrence that edit scripts have been generated based on comparison with a template. For example, when the threshold has been exceeded for the last 5 comparisons with a template, then a significant change may have occurred. Of course, other tests may be flexibly configured according to the particular configuration and environment of the implementation.

Upon the occurrence of either or both of step 610 or 620, at step 630, a sample of previous communications compared to the template may be selected. For example, for each URL or elements of the URL that have a common template, a sample of responses with that URL or those elements of the URL are selected. Each of the sample responses may be a candidate template. The number of responses in the sample may be flexibly selected based upon desired system performance traits. For example, a greater number of responses selected will result in a more ideal template and as a result, smaller edit scripts. However, as described below (with regard to block 640), the number of comparisons utilized may increase exponentially resulting in an exponential increase in computing time. This tradeoff can be determined by the implementing party based on the characteristics of the variations between documents. In some embodiments, a sample of responses may be selected randomly, based on a last set of responses, or based on responses that coincide with the majority of responses having a particular size of data.

At step 640, the sample response selected at step 630 may be compared with each other. For example, a difference algorithm may be used to calculate an edit distance for the responses in the sample. An edit distance may be quantified as the "dissimilarity" between two content in responses (e.g., documents). The edit distance may further represent a minimum number of operations required to "convert" a first element of content in a response into a second element of content in a different response. Various edit distance calculation techniques (i.e., distance algorithms) may be utilized that are well-known to one skilled in the art, and may include use of one or more of Levenshtein distances, longest common subsequence distances, Hamming distances, Jaro-Winkler distances, and the like. In some embodiments, an average edit distance can be calculated for each response in the sample based upon each of the individually-calculated edit distances for that response.

At step 650, the member with the smallest average edit distance is compared to the template. Upon determining that the member with the smallest average edit distance does not differ from the template, no further operations are performed. Workflow 600 proceeds from step 650 to end at step 670. Upon determining that the member does differ from the template, workflow 600 proceeds to step 660. At step 660, upon determining that the member with the smallest average edit distance is different than the template, the member with the smallest average edit distance is replaced as the template. The member may correspond to a response that is a candidate template. As such, the template is replaced with the candidate template, which is selected based on having the smallest average edit distance. The technique described with reference to FIG. 6 results in determining a template that is close to the graph center of the edit graph comprising the content of all the communications, and thus is optimal for use in compression. In some embodiments, if the member having the smallest average edit distance does not differ from the template, then no update to the template is required as the current template is determined to already optimal.

Workflow 600 proceeds from step 660 to end at step 670.

IV. Stored Resource Searching

A. Resource Indexing

As the amount of data stored to represent network traffic greatly increases, the processing for search and retrieval of data representing network traffic increases. Thus, the techniques for compact storage of network traffic enable a reduction in the amount of network traffic that is stored. As such, the amount of data to be searched and retrieved is greatly reduced.

For a template that is created, the words in the template may be stored using a variety of techniques. The words may be indexed in a number of different index formats to enhance their searchability for identifying a template. The words of a template may correspond to tokenized data that is parsed from a communication. As discussed above, each template is assigned a unique identifier (e.g., a hash of the entire document, or an identifier based on the URL or the elements of the URL of a document from which is a template is generated). Words may be indexed in a data structure (e.g., a hash table) based on template identifiers. Each of the template identifiers correspond to a template. Each word in the hash table may be associated with a template identifier of a template that has that word. The hash table may be configured to store information indicating a cardinality of all the different words that are discovered in the different templates.

The hash table of words may be searchable to identify a template based on one or more words. For example, the indexes of the hash table for a search query, a list of templates containing a word can be retrieved from the hash table. It can be possible to query the hash table to determine whether one or more templates contains a particular word by first querying the hash table for a sorted list of the word, and then implementing a binary search on the sorted list to determine the membership of the template identifier in relation to the sort listed for the word. The number of occurrences of each word in the index, or the cardinality of that word, can also be determined by performing a look up in the hash table. When a single word is searched, the hash table is queried to rapidly return the list of template identifiers that contain the word. When multiple words are queried, the result set is reduced to the smallest number of templates based on the word having the lowest cardinality among all the queried words.

Figure 7:
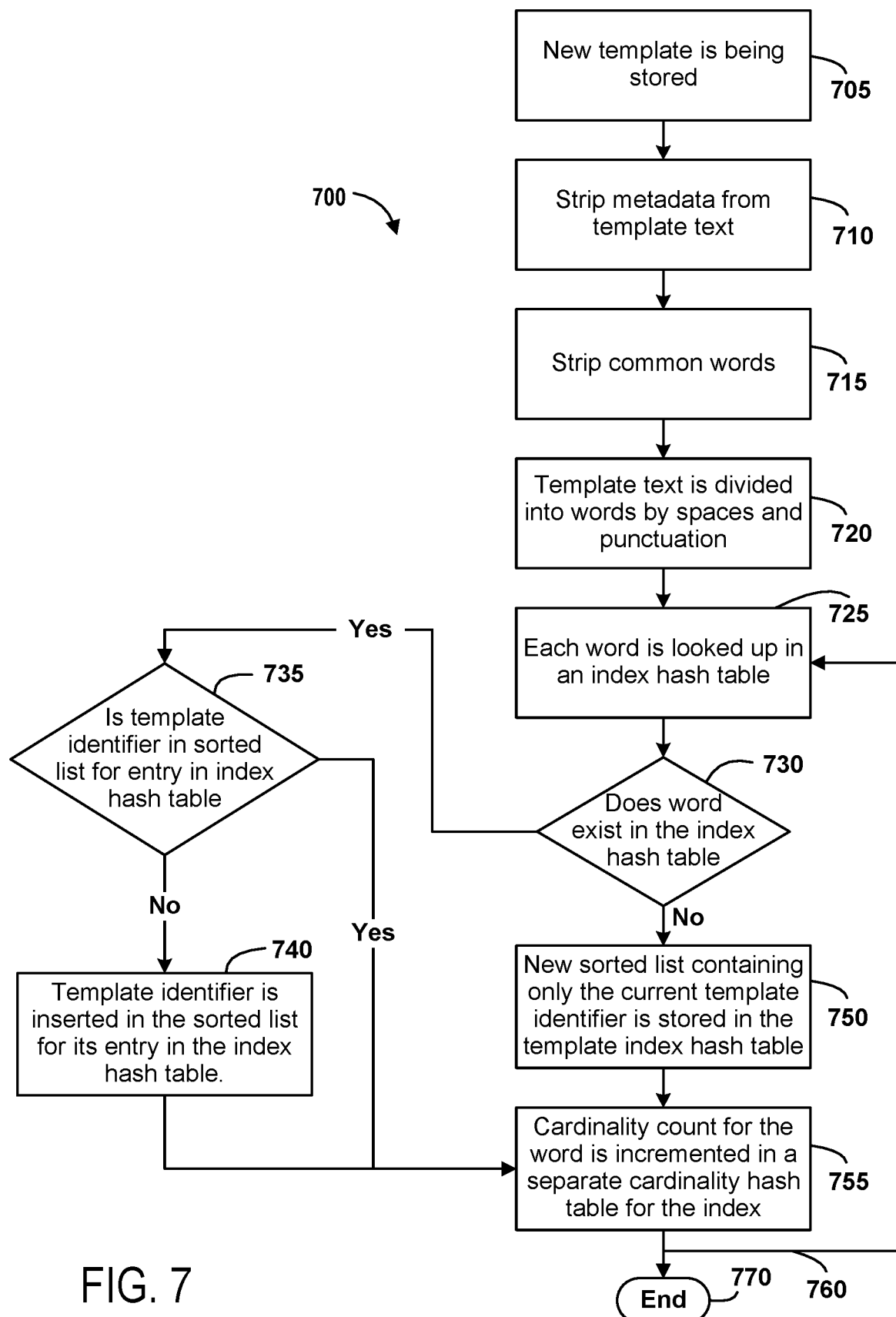
FIG. 7 illustrates an example workflow for template indexing according to some embodiments.

FIG. 7 illustrates an example workflow 700 of a process for indexing and searching content stored from communications according to some embodiments. Workflow 700 begins with step 705, in which is a new template is being stored. A template may be created and stored as disclosed herein. Steps in workflow 700 are described as being performed with respect to the template stored at step 705; however, in some embodiments, one or more of the steps performed with respect to a new template may be performed on content before it is added to the template.

At step 710, the metadata associated with a communication (e.g., a response) can be removed from a template to improve efficiency of indexing when the focus of searching communications is the content, and not the metadata. For example, when a response includes a document in an HTML format, the HTML tags and/or other metadata such as embedded code (e.g., Javascript) or style information (e.g., CSS information) can be removed from the document so only content in the document may remain. To further illustrate, a document in a response may include content with formatted with HTML tags, such as "<div>I love my brown dog, yellow cat, and gold fish.</div>". The resulting text stored in a new template after the metadata is removed would be "I love my brown dog, brown cat, and gold fish."

At step 715, words may be removed from a template to improve efficiency of indexing. Common or unnecessary words may be removed from a template. For example, words such as "a", "the", and "or" may not provide value in search results. Such words may include articles that provide limited or no value as to the overall content stored in a template. The inclusion of such words may cause the indexes of the words to be larger as well, contributing to the processing time to create the hash table and/or search the words in a hash table. Some words may be removed from the template prior to indexing to improve processing time. Using the example above at step 710, a word "and" may be removed such that the remaining text would be "I love my brown dog, brown cat, gold fish."

At step 720, content in a template may be parsed to identify one or more words in the template. In some embodiments, the template text is parsed (e.g., tokenized) using delimiters (e.g., commas and other punctuation, and/or whitespace, etc.) to result in an identification of individual words. The content may be parsed by any number of delimiters. This process may include generating a set of pointers/indices to individual words in the template text, and/or may include generating an array of individual words. Continuing the example introduced at step 710, an array may be generated by parsing content such that the following elements are identified: "I"; "love"; "my"; "brown"; "dog"; "brown"; "cat"; "gold"; "fish".

At step 725, each of the words identified at step 720 may be searched in the hash table of indexed words, as described with reference to FIG. 6. A query may be performed against the hash table to determine whether each of the words of content in a template exists in the hash table. At step 730, a determination is made as to whether a word exists in a hash table based on querying the hash table for that word. Upon determining that a word exists in the hash table, of indexed words, workflow 700 proceeds to step 35. Upon determining that a word does not exists in the hash table of indexed words, workflow 700 proceeds to step 750.

At step 735, upon determining that a word exists in the hash table, the hash table is examined to determine whether a template identifier of the template having the word already exists in the hash table. For example, the sorted list of identifiers for the word in the hash table may be examined to determine whether it contains the template identifier of the template containing the word queried against the hash table at step 725. Upon determining that the template identifier for the word exists in the hash table, workflow 700 may proceed to step 755. Upon determining that the template identifier for the word does not exist in the hash table, workflow 700 may proceed to step 740. At step 740, the template identifier of the template including the word is inserted in the sorted list of template identifies for entry in the hash table. While a sorted list is not required, one with skill in the art will note that a sorted list can be used as an abstract data type set, which provides for an efficient mechanism to manage the members associated with the template identifier, including an efficient mechanism for testing membership to the sorted list of identifiers. Workflow 700 proceeds from step 740 to step 755.

Now returning to step 730, where upon determining that a word does not exist in the hash table, workflow proceeds to step 750. At step 750, a new sorted list is created and stored in the hash table. The new sorted list includes the template identifier of the template subject to processing for workflow 700. Workflow may then continue to step 755, which performs operations discussed above.

At step 755, a cardinality count for the word is incremented in a data structure (e.g., a hash table) storing cardinality information for words. The data structure may be the same or different as the index hash table used for search queries.

Workflow 700 proceeds from step 755 to back to step 725 for processing of each additional word identified in the template. Workflow 700 proceeds to end at step 770 upon completion of workflow 700 for processing of each word identified in the template.

Table 1 below elaborates an example of on an algorithm implementing the process described with reference to FIG. 6 for workflow 600.

TABLE 1

Processing New Templates and Communications

Process each new template (T):
1. For each word (W) in T:
    1. Add to T a template index for W.
Process each new communication (R) (e.g., a response or a request), with an addition (A) of content or a deletion (D) of content, using template T:
1. For each word W in A of a R:
    1. Add a list of templates for a communication R containing W.
    2. Add R to addition index of T for W.
2. For each word W in D:
    1. Add R to deletion index of template T for W.
Add to Index I, word W, communication R or template X
1. L = sorted list for W in I.
2. If L exists:
    1. Add X to L.
3. If L does not exist:
    1. L = [X]
    2. Set L as the sorted list for W in I.
4. Increment cardinality of W in I.

Communications stored as edit scripts from the template may be indexed by indexing the words in the additions and/or removals contained in the edit script in a similar fashion to how words in the templates are indexed. Each communication may be given a unique identifier and two data structures (e.g., a hash table) of sorted lists may be created. The first data structure can be indexed on words that were added, with a sorted list of identifiers of the communications from which the word was added to the template for the communication. The second data structure may be indexed on words that were removed, with a sorted list of response identifiers where that word was removed from the template for the communication.

B. Resource Searching

Figure 8:
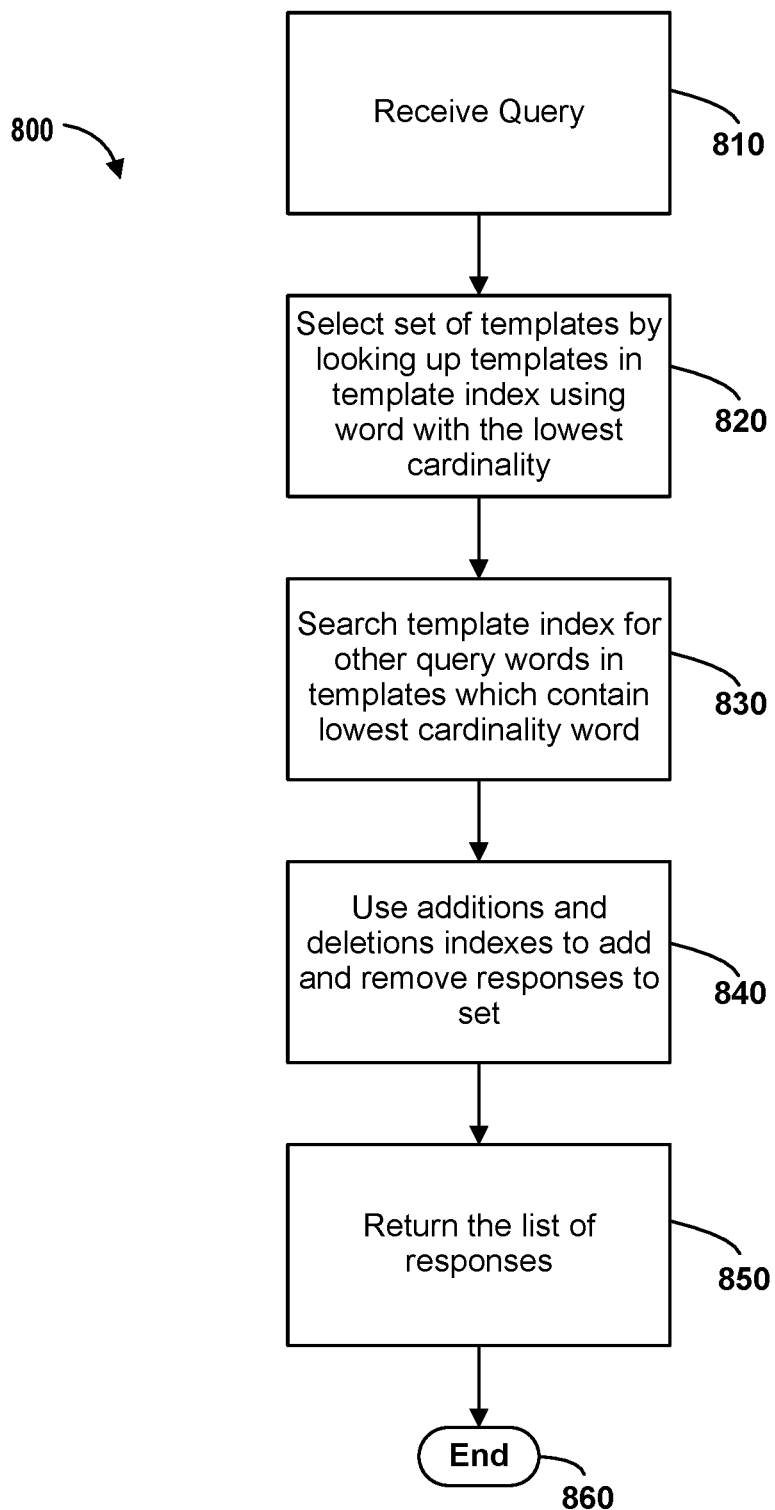
FIG. 8 illustrates an example workflow for execution of search operations according to some embodiments.

FIG. 8 illustrates an example workflow 800 for execution of search operations according to some embodiments. The search can be performed based on the templates generated from the edit scripts determined from the communications. Those skilled in the art will appreciate that the approach shown in FIG. 8 resulting in the most efficient search minimizes a subset of words for searching using the lowest cardinality terms first.

Workflow 800 may begin at step 810 by receiving a query based on one or more terms (e.g., words). The query may include query operators (e.g., AND, OR, NOT, NEAR, SEQUENCE, COUNT, quotation marks for grouping, parenthesis, etc.). For example, a query may be "brown dog." Another example query may be "brown AND dog" or "brown dog NOT cat." A query with term(s) may be received to identify one or more templates that are applicable based on the term(s).

At step 820, a result of templates (e.g., one or more templates) are identified based on the word (i.e., search term). For a query with multiple terms, the terms may be processed to determine the term with the lowest cardinality. The lowest cardinality may be determined using the template indexes. Using the template index, the lowest cardinality word is used to return the list of templates containing that word. Using the example above, the words "brown" and "dog" would be looked up in a hash table storing an index of words and templates having each of those words. A lookup operation may be performed to determine the cardinality of the number of templates containing those words that are sought in the query. In this example, the word "dog" returns the least number of templates (i.e., has a lower cardinality than "brown") and is used to select a list of templates containing the word "dog" using the template indexes.

At step 830, the words in the query that do not have a cardinality of the least number of templates identified at 820 are searched in the results of templates identified at step 820. Continuing the example, the results of templates would be searched for the word "brown".

At step 840, the additions and deletion indexes described in FIG. 7 can be used to identify templates which contain specific terms in a query, such as "brown" and "dog" in the query received at 810. Continuing the example, if the template contained the word "dog", but the deletion index contained the word "dog", then the template would be removed from the templates identified at step 820. Conversely, if the template did not contain the word "dog" or "brown", but the additions index did, the template would be added to the templates identified at step 820.

At step 850, the result of templates remaining after step 840 are returned in the communication including the words received in the query at step 810. Workflow 800 may proceed to end at step 860.

Table 2 below is an example of on an algorithm implementing the process described with reference to FIG. 8 for workflow 800. The example algorithm uses references and symbols to terms disclosed herein, such as terms described with reference to Table 1.

TABLE 2

Figure 9:
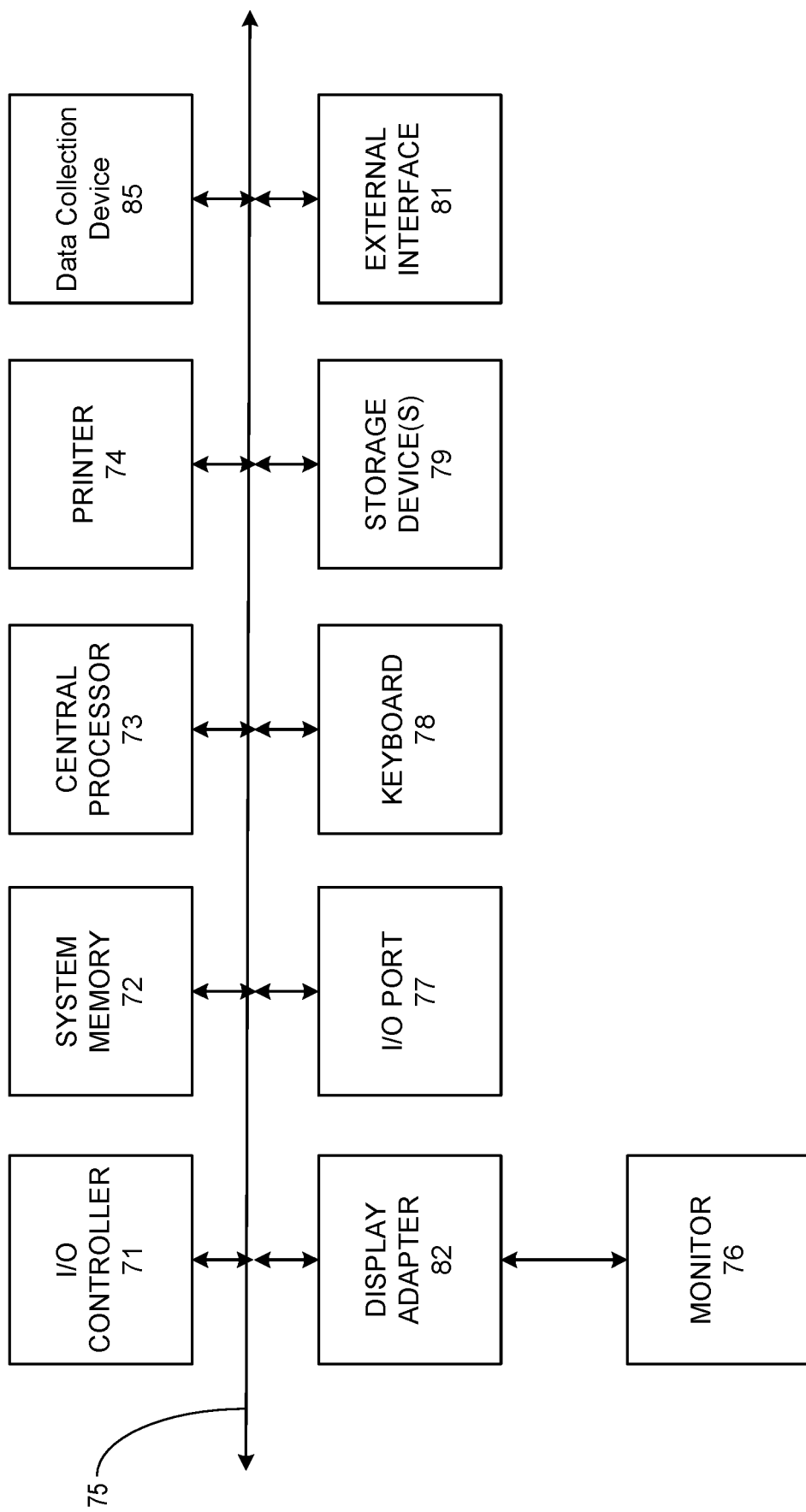
FIG. 9 illustrates a block diagram of an example computer system for implementing some embodiments.

Query (Q) for terms (T):

1. Z = { }
2. W = word in Q with lowest cardinality
3. For each template T with communications containing W:
    1. D = list of words in Q that are in T.
    2. A = list of words in Q that are not in T.
    3. If A is empty:
        1. For each communication R, using T:
            1. For each word X in D:
                1. If R is in the deletion index of template T for X:
                      1. Skip to the next R in 3.3.1.
            2. Add R to Z.
    4. If A is not empty:
        1. X = word in A with lowest cardinality in addition index of template T.
        2. For each response R in the addition index for X:
            1. For each word Y in D:
                1. If R is in the deletion index of template T for Y:
                      1. Skip to the next R in 3.4.2.
            2. For each word Y in A − {X}:
                1. If R is not in the addition index of template T for Y:
                      1. Skip to the next R in 3.4.2.
            3. Add R to Z.
4. Return Z
Determine cardinality of word W:
1. Set C = 0.
2. For each template T with responses containing W:
    1. If T contains W:
        1. C = C + |responses using template T|
    2. If T does not contain W:
        1. C = C + cardinality of W in addition index of template T.
    3. C = C − cardinality of W in deletion index of template T.
3. Return C V. Computer System Any of the computer systems mentioned herein may utilize any suitable number of subsystems. Examples of such subsystems are shown in FIG. 9 in computer apparatus 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 9 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Figure 10:
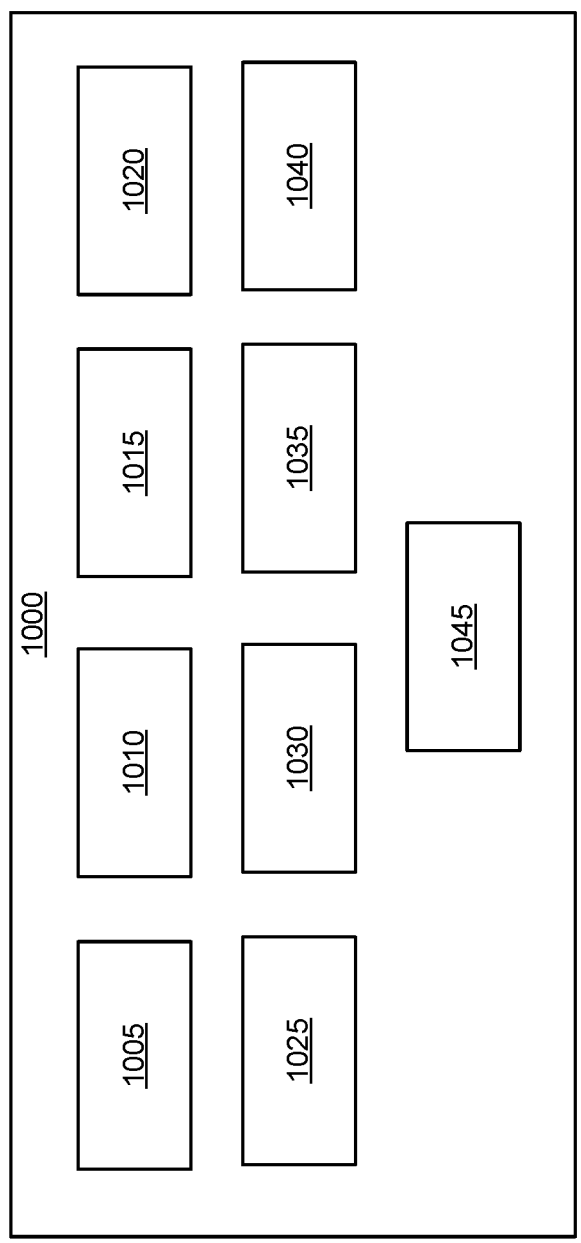
FIGS. 10 and 11 illustrate functional block diagrams of a computer system, in which various aspects of the present invention may be implemented.
Figure 11:
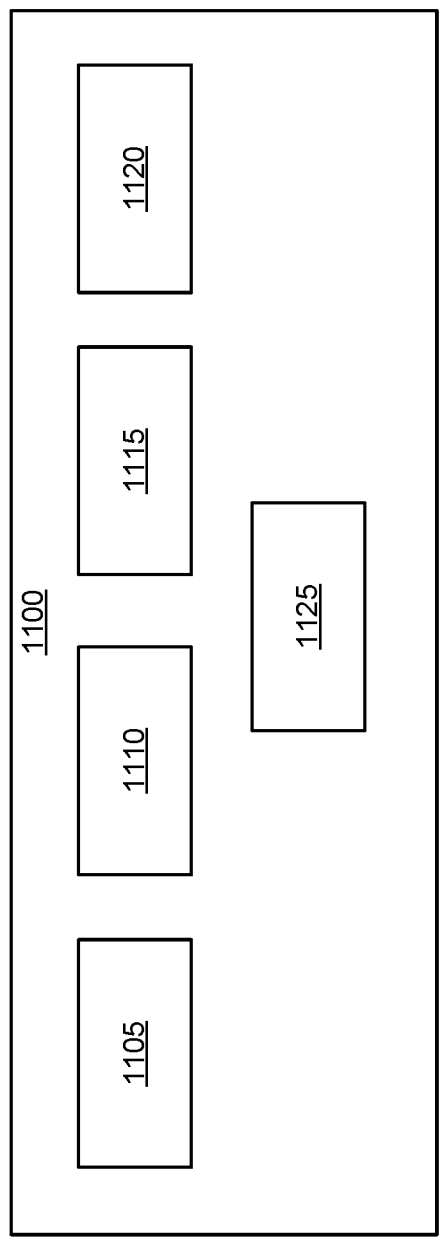

FIGS. 10 and 11 illustrate functional block diagrams of a computer system, in which various aspects of the present invention may be implemented. The functions blocks of the computer system may be implemented by hardware, software, or a combination of hardware and software to carry out the principles of the invention. It is understood by persons of skill in the art that the functional blocks described in FIGS. 10 and 11 may be combined or separated into sub-blocks to implement the principles of the invention as described above. Therefore, the description herein may support any possible combination or separation or further definition of the functional blocks described herein.

Referring to FIG. 10, computer system 1000 may be provided for compact data storage of network traffic and the efficient search thereof. Computer system 1000 may include a first receiving unit 1005, an identifying unit 1010, a determining unit 1015, a retrieving unit 1020, a comparison unit 1025, a computing unit 1030, a generating unit 1035, a storing unit 1040, and indexing unit 1045.

Receiving unit 1005 may receive one or more data packets comprising a communication transmitted by a server computer. The communication may include a resource requested by a client computer system. Identifying unit 1010 may parse, based on one or more delimiters, the requested resource to identify a plurality of data items in the requested resource. Determining unit 1015 may generate a first set of hash values for the plurality of data items, where the first set of hash values is generated based on applying one or more hashing algorithms to the plurality of data items. Retrieving unit 1020 may retrieve, one or more stored templates, each of the one or more stored templates including different content. Determining unit 1015 may determine a second set of hash values for each of the one or more stored templates. Comparison unit 1025 may, for each stored template of the one or more stored templates, perform a comparison of the first set of hash values to the second set of hash values corresponding to each stored template. Computing unit 1030 may compute a similarity value based on the comparison. Generating unit 1035 may, upon determining that the similarity value indicates that the first set of hash values is not similar to the second set of hash values for a first stored template, generate an edit log using the plurality of data items and the first stored template. The edit log may identify differences between the plurality of data items of the requested resource and the first stored template. Storing unit 1040 may store the edit log in a data store. Storing unit 1040 may, upon determining that the similarity value indicates that the first set of hash values is similar to the second set of hash values for a first stored template, store the plurality of data items as a new template.

In some embodiments, comparison unit 1025 may determine whether the similarity value satisfies the similarity threshold. Based on determining that the similarity value does not satisfy the similarity threshold, comparison unit 1025 may determine that the first set of hash values is not similar to the second set of hash values for the first stored template. Based on determining that the similarity value does satisfy the similarity threshold, comparison unit 1025 may determine that the first set of hash values is similar to the second set of hash values for the first stored template.

In some embodiments, to generate the edit log, generating unit 1035 may execute a difference algorithm to identify the differences between the plurality of data items of the requested resource and the first stored template.

In some embodiments, one or more data packets may be received as mirrored packets from a data tap device located between the client computer system and the server computer. Additionally or alternatively, one or more data packets may be received by computer system 1000 directly by transmission from the client computer system. In some embodiments, receiving a set of data packets comprises a request for the resource transmitted by the client computer system to the server computer. The request for the resource may include a HyperText Transfer Protocol (HTTP) request. Identifying unit 1010 may identify a resource identifier of the requested resource, where the resource identifier of the resource comprises at least some of a Uniform Resource Locator (URL). The communication may include an HTTP response. The resource may include one of a HyperText Markup Language (HTML) document, a Cascading Style Sheets (CSS) file, or a JavaScript file.

In some embodiments, storing unit 1040 may determine that the stored template is to be updated and updating the stored template based on the edit log. Determining that the stored template is to be updated may include storing unit 1040 determining that a threshold amount of time has passed since the stored template was stored. Determining that the stored template is to be updated may include storing unit 1040 identifying that a first threshold amount of edit logs have been generated for the stored template and that each of the edit logs include at least a second threshold amount of differences between the respective edit log and the stored template. In some embodiments, storing unit 1040 may: identify a plurality of candidate templates based upon a corresponding plurality of edit logs stored in the data store; select one of the plurality of candidate templates to be the stored template, where selecting the one of the plurality of candidate templates to be the stored template comprises calculating an average edit distance value for each of the plurality of candidate templates by determining an edit distance between each distinct pairing of the plurality of candidate templates. Selecting the one of the plurality of candidate templates to be the stored template may include storing unit 1040 to: determine that the one of the plurality of candidate templates has a smallest calculated average edit distance value; and determining that the one of the plurality of candidate templates is different than the stored template.

In some embodiments, indexing unit 1045 may: update a plurality of entries of a first index associated with a plurality of words of the resource to identify the resource; and increment a cardinality count value of a plurality of entries of a second index associated with the plurality of words of the resource. The first index and the second index may each comprise a hash table.

Referring to FIG. 11, computer system 1100 may be provided for compact data storage of network traffic and the efficient search thereof. Computer system 1100 may include a receiving unit 1105, a determining unit 1110, an identifying unit 1115, a generating unit 1120, and a transmitting unit 1125.

Receiving unit 1105 may receive a query including a plurality of search terms. Determining unit 1110 may determine a plurality of cardinality values, each of the plurality of cardinality values determined for a different one of the plurality of search terms. A cardinality value determined for one of the plurality of search terms may indicate one or more resource templates including the search term. Each of the one or more resource templates may be associated with a particular resource and may be further associated with one or more communications comprising different versions of the particular resource. Identifying unit 1115 may identify a plurality of the resource templates including a first search term. The first search term may be the one of the plurality of search terms. The first search term may have a lowest determined cardinality value of the determined plurality of cardinality values. Generating unit 1120 may, for each of the plurality of resource templates, generate a result set of data for the query, based upon using at least one of the plurality of search terms and one or both of an addition index and a deletion index. The result set may be generated to include an identifier of each of the one or more responses associated with the resource template. The addition index may identify, for a first set of words that do not exist in the resource template, a first set of responses associated with the resource template that does include the first set of words. The deletion index may identify, for a second set of words that do exist in the resource template, a second set of responses associated with the resource template that does not include the second set of words. Transmitting unit 1125 may transmit the result set of data for the query.

It is apparent for those skilled in the art that, for the particular operation processes of the units described above, reference may be made to the corresponding steps/components in the related method/system embodiment sharing the same concept and the reference is regarded as the disclosure of the related units too. And therefore some of the particular operation processed will not be described repeatedly or in detail for concision of the description.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional, functional, and/or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods disclosed herein may be totally or partially performed with a computer system including one or more processors, which can be configured to perform the steps. Thus, embodiments can be directed to computer systems configured to perform the steps of any of the methods disclosed herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The features and advantages described in the detailed description are not all inclusive and, in particular, many additional features and advantages will be apparent to one of ordinary skill in the art in view of the drawings, detailed description, and claims. Moreover, it should be noted that the language used in the detailed description has been principally selected for readability and instructional purposes, and may not have been selected to delineate or circumscribe the inventive subject matter.

Note that in this description, references to "one embodiment," "an embodiment" or "some embodiments" mean that the feature being referred to is included in at least one embodiment of the invention. Further, separate references to "one embodiment" or "some embodiments" in this description do not necessarily refer to the same embodiment(s); however, neither are such embodiments mutually exclusive, unless so stated and except as will be readily apparent to those skilled in the art. Thus, the invention can include any variety of combinations and/or integrations of the embodiments disclosed herein. However, other embodiments of the invention may be directed to specific embodiments relating to each individual aspect, or specific combinations of these individual aspects.

Upon reading this detailed description, those of skill in the art will appreciate still additional alternative structural and functional designs for a system and method for compact data storage of network traffic and efficient search through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A computer-implemented method for compact storage of network communication, the method comprising:
    receiving, by a computer system, one or more data packets comprising a communication transmitted by a server computer, the communication including a resource requested by a client computer system;
    analyzing, by the computer system, the received data packets including the resource to determine a content type of the resource;
    selecting, by the computer system, one or more delimiters for parsing the resource, wherein the delimiters are selected based on the determined content type of the resource;
    parsing, by the computer system, based on the selected one or more delimiters, the resource to identify a plurality of data items in the resource;
    generating, by the computer system, a first set of hash values for the plurality of data items, wherein the first set of hash values is generated based on applying one or more hashing algorithms to the plurality of data items;
    retrieving, by the computer system, a plurality of stored templates, each of the plurality of stored templates including different content;
    for each particular stored template of the retrieved plurality of stored templates:
        (a) determining, by the computer system, a second set of hash values for the particular stored template;
        (b) performing, by the computer system, a comparison of the first set of hash values to the second set of hash values for the particular stored template; and
        (c) computing, by the computer system, a similarity value based on the comparison of the first set of hash values to the second set of hash values, the similarity value indicating whether the first set of hash values is similar to the second set of hash values for the particular stored template;
    upon determining that the similarity value indicates that the first set of hash values is similar to the second set of hash values for a first particular stored template:
        generating, by the computer system, an edit log using the plurality of data items and the first particular stored template, wherein the edit log identifies differences between the plurality of data items of the resource and the first particular stored template;
        storing, by the computer system, the edit log in a data store; and
    upon determining that one of the second set of hash values determined for the plurality of stored templates does not match the first set of hash values determined for the plurality of data items and that the content type of the resource is a binary document:
        storing, by the computer system, the binary document as a new template;
    determining, by the computer system, that the first particular stored template is to be updated; wherein determining that the first particular stored template is to be updated comprises:
        identifying that a first threshold amount of edit logs have been generated for the first particular stored template and that a size of each of the edit logs exceeds a second threshold amount; and
    updating, by the computer system, the first particular stored template based on the edit log.

2. The computer-implemented method of claim 1, wherein generating the edit log includes executing a difference algorithm to identify the differences between the plurality of data items of the resource and the first particular stored template.

3. The computer-implemented method of claim 1, wherein the one or more data packets are mirrored packets received from a data tap device located between the client computer system and the server computer.

4. The computer-implemented method of claim 1, wherein the one or more data packets are transmitted by the client computer system directly to the computer system.

5. The computer-implemented method of claim 1, further comprising:
    receiving a set of data packets comprising a request for the resource transmitted by the client computer system to the server computer, wherein the request for the resource comprises a HyperText Transfer Protocol (HTTP) request;
    identifying a resource identifier of the resource, wherein the resource identifier of the resource comprises at least some of a Uniform Resource Locator (URL);
    and wherein the communication comprises an HTTP response; and
    wherein the resource comprises one of a HyperText Markup Language (HTML) document, a Cascading Style Sheets (CSS) file, or a JavaScript file.

6. The computer-implemented method of claim 1, wherein determining that the first particular stored template is to be updated comprises:
    determining that a threshold amount of time has passed since the first particular stored template was stored.

7. The computer-implemented method of claim 1, further comprising:
 identifying a plurality of candidate templates based upon a corresponding plurality of edit logs stored in the data store; and
 selecting one of the plurality of candidate templates to be the first particular stored template, wherein selecting the one of the plurality of candidate templates to be the first particular stored template comprises calculating an average edit distance value for each of the plurality of candidate templates by determining an edit distance between each distinct pairing of the plurality of candidate templates.

8. The computer-implemented method of claim 7, wherein selecting the one of the plurality of candidate templates to be the first particular stored template further comprises:
 determining that the one of the plurality of candidate templates has a smallest calculated average edit distance value; and
 determining that the one of the plurality of candidate templates is different than the first particular stored template.

9. The computer-implemented method of claim 1, further comprising:
 updating a plurality of entries of a first index associated with a plurality of words of the resource to identify the resource; and
 incrementing a cardinality count value of a plurality of entries of a second index associated with the plurality of words of the resource.

10. The computer-implemented method of claim 9, wherein the first index and the second index each comprise a hash table.

11. The computer-implemented method of claim 1, wherein the method further comprises:
 selecting, by the computer system, the first particular stored template from the plurality of stored templates based on a first similarity value for the first particular stored template being greater than similarity values for other templates of the plurality of stored templates.

12. The computer-implemented method of claim 1, wherein determining the content type of the resource comprises:
 determining that the received data packets correspond to a response to a HyperText Transfer Protocol (HTTP) request; and
 analyzing headers of the response to the HTTP request to determine a text resource type of the resource, wherein the text resource type is one of a HyperText Markup Language (HTML) document, a Cascading Style Sheets (CSS) file, or a JavaScript file,
 wherein different delimiters selected for parsing the resource based on whether the text resource type is an HTML document, a CSS file, or a JavaScript file.

13. The computer-implemented method of claim 12, further comprising:
 in response to determining that the content type of the resource is a text content type, storing within the edit log: (a) data identifying an object within the first particular stored template as a closest object to the resource of the text content type, and (b) data identifying differences between the resource of the text content type and the identified closest object within the first particular stored template.

14. A system for compact storage of network communication, the system comprising:
 one or more processors;
 a memory accessible to the one or more processors, the memory comprising instructions that, when executed by the one or more processors, causes the one or more processors to perform operations comprising:
  receiving one or more data packets comprising a communication transmitted by a server computer, the communication including a resource requested by a client computer system;
  analyzing the received data packets including the resource to determine a content type of the resource;
  selecting one or more delimiters for parsing the resource, wherein the delimiters are selected based on the determined content type of the resource;
  parsing based on the selected one or more delimiters, the resource to identify a plurality of data items in the resource;
  generating a first set of hash values for the plurality of data items, wherein the first set of hash values is generated based on applying one or more hashing algorithms to the plurality of data items;
  retrieving a plurality of stored templates, each of the plurality of stored templates including different content;
  for each particular stored template of the retrieved plurality of stored templates:
   (a) determining a second set of hash values for the particular stored template;
   (b) performing a comparison of the first set of hash values to the second set of hash values for the particular stored template; and
   (c) computing a similarity value based on the comparison of the first set of hash values to the second set of hash values, the similarity value indicating whether the first set of hash values is similar to the second set of hash values for the particular stored template;
  upon determining that the similarity value indicates that the first set of hash values is similar to the second set of hash values for a first particular stored template:
   generating an edit log using the plurality of data items and the first particular stored template, wherein the edit log identifies differences between the plurality of data items of the resource and the first particular stored template; and
   storing the edit log in a data store;
  upon determining that one of the second set of hash values determined for the plurality of stored templates does not match the first set of hash values determined for the plurality of data items and that the content type of the resource is a binary document:
   storing the binary document as a new template;
  determining, by the computer system, that the first particular stored template is to be updated; wherein determining that the first particular stored template is to be updated comprises:
   identifying that a first threshold amount of edit logs have been generated for the first particular stored template and that a size of each of the edit logs exceeds a second threshold amount; and
  updating, by the computer system, the first particular stored template based on the edit log.

15. The system of claim 14, wherein the operations further comprise:
- determining whether the similarity value computed for the first particular stored template satisfies a similarity threshold;
- based on determining that the similarity value computed for the first particular stored template does not satisfy the similarity threshold, determining that the first set of hash values is not similar to the second set of hash values for the first particular stored template; and
- based on determining that the similarity value does satisfy the similarity threshold, determining that the first set of hash values is similar to the second set of hash values for the first particular stored template.

16. The system of claim 14, wherein the operations further comprise:
- upon determining that the similarity value computed for the first particular stored template indicates that the first set of hash values is not similar to the second set of hash values for a first particular stored template, storing the plurality of data items as a new template.

\* \* \* \* \*